(12) United States Patent
Baek et al.

(10) Patent No.: US 12,021,745 B2
(45) Date of Patent: Jun. 25, 2024

(54) METHOD AND APPARATUS FOR TRAFFIC ROUTING IN COMMUNICATION SYSTEM

(71) Applicant: ELECTRONICS AND TELECOMMUNICATIONS RESEARCH INSTITUTE, Daejeon (KR)

(72) Inventors: Seung Kwon Baek, Daejeon (KR); Jun Hwan Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 11 days.

(21) Appl. No.: 17/891,497

(22) Filed: Aug. 19, 2022

(65) Prior Publication Data
US 2023/0065057 A1  Mar. 2, 2023

(30) Foreign Application Priority Data
Aug. 23, 2021  (KR) .................. 10-2021-0111267

(51) Int. Cl.
*H04L 45/00* (2022.01)
*H04L 45/02* (2022.01)
*H04L 45/745* (2022.01)

(52) U.S. Cl.
CPC ............ *H04L 45/566* (2013.01); *H04L 45/02* (2013.01); *H04L 45/745* (2013.01)

(58) Field of Classification Search
CPC ...... H04L 45/566; H04L 45/02; H04L 45/745
USPC ....................................................... 709/238
See application file for complete search history.

(56) References Cited

U.S. PATENT DOCUMENTS

| 10,136,359 B2 | 11/2018 | Hampel et al. |
| 10,715,417 B2 | 7/2020 | Park et al. |
| 2012/0163171 A1 | 6/2012 | Lee et al. |
| 2016/0028622 A1 | 1/2016 | Kwak et al. |
| 2019/0349286 A1 | 11/2019 | Bruno et al. |
| 2020/0367132 A1 | 11/2020 | Kim et al. |

(Continued)

FOREIGN PATENT DOCUMENTS

| KR | 10-2245404 B1 | 4/2021 |
| WO | 2014/209040 A1 | 12/2014 |

(Continued)

OTHER PUBLICATIONS

Michele Polese et al., "Integrated Access and Backhaul in 5G mmWave Networks: Potential and Challenges", Mobile Communications and Networks, IEEE Communications Magazine, Mar. 2020.

*Primary Examiner* — Lan Dai T Truong
(74) *Attorney, Agent, or Firm* — LRK PATENT LAW FIRM

(57) ABSTRACT

An operation method of a boundary IAB node between a first topology and a second topology in a communication system may include: receiving, from a first IAB donor node included in the first topology, a first address of a first node included in the second topology; receiving, from a node connected to the boundary IAB node, data including a relay request using a second address as a destination address; rewriting the destination address of the data with the first address indicated by the second address in a mapping table; and routing the data towards the first node.

12 Claims, 20 Drawing Sheets

(56) References Cited

U.S. PATENT DOCUMENTS

2021/0168646 A1   6/2021  Chen et al.
2022/0132393 A1*  4/2022  Akl ..................... H04W 40/22

FOREIGN PATENT DOCUMENTS

WO    2017084487 A1   5/2017
WO    2021/187933 A1  9/2021

* cited by examiner

FIG. 4

| D/C | R | R | R | destination |   |
|-----|---|---|---|-------------|---|
| destination ||| | path |
| path |||||
| data |||||

FIG. 5

| D/C | PDU type || R | R | R |
|-----|------|------|---|---|---|
| source |||||||
| source | path(S) |||||
| path(S) || destination ||||
| destination ||| path(D) |||
| path(D) |||||
| time stamp (Tx) |||||
| accumulated latency |||||

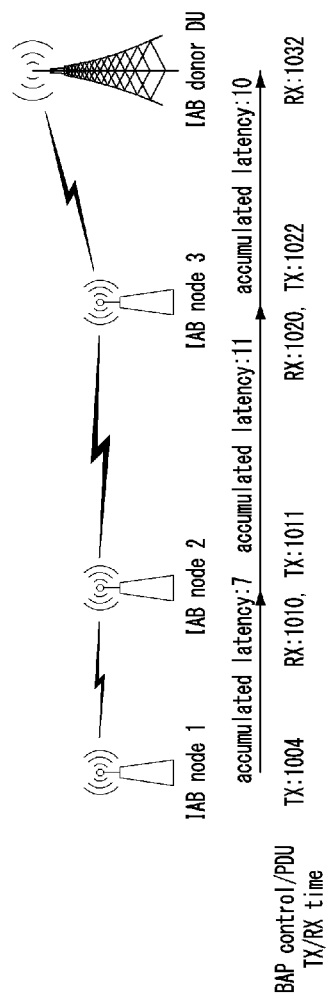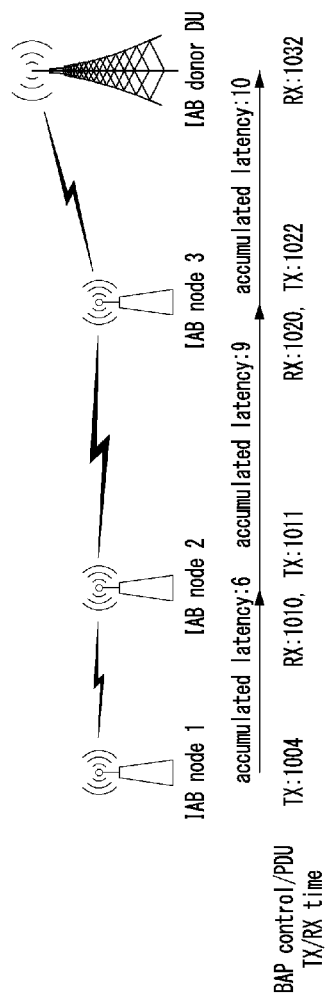

FIG. 8

| D/C | R | R | R | destination ||
|---|---|---|---|---|---|
| destination ||||| path |
| path |||||||
| hop count |||||
| data |||||

FIG. 9

| D/C | R | R | R | destination ||
|---|---|---|---|---|---|
| destination ||||| path |
| path |||||
| time stamp (Tx) |||||
| allowable packet transmission delay budget |||||
| data |||||

FIG. 15

| D/C | F | R | R | destination |
|---|---|---|---|---|
| destination | | | | path |
| path | | | | |
| routing index | | | | |
| data | | | | |

FIG. 16

| D/C | R | R | R | destination |
|---|---|---|---|---|
| destination | | | | path |
| path | | | | |
| actual destination | | | | |
| actual destination | actual path | | | |
| actual path | | | R | |
| data | | | | |

METHOD AND APPARATUS FOR TRAFFIC ROUTING IN COMMUNICATION SYSTEM

CROSS-REFERENCE TO RELATED APPLICATIONS

This application claims priority to Korean Patent Applications No. 10-2021-0111267, filed on Aug. 23, 2021, and No. 10-2022-0085584, filed on Jul. 12, 2022, with the Korean Intellectual Property Office (KIPO), the entire contents of which are hereby incorporated by reference.

BACKGROUND

1. Technical Field

The present disclosure relates to a traffic routing technique in a communication system, and more particularly, to a traffic routing technique in a communication system for traffic transmission of a multi-hop based integrated backhaul network.

2. Description of Related Art

For the processing of rapidly increasing wireless data, a communication network (e.g., new radio (NR) communication system) that uses a frequency band (e.g., a frequency band of 6 GHz or above) higher than that of the long term evolution (LTE) or LTE-Advanced communication system (e.g., a frequency band of 6 GHz or below) is being considered. Since such the NR communication system uses a high frequency band of 6 GHz or above, high density of cells may be required to ensure service coverage. Due to this, the NR communication system may require a lot of cost to install and maintain a large number of base stations. Therefore, the NR communication system may have a high demand for a wireless backhauling technology that can replace optical cables at low cost.

In order to meet such the demand, an integrated access and backhaul (IAB) network technology has emerged. The IAB network can flexibly provide cost-effective multi-hop-based wireless backhaul compared to wired backhaul. Therefore, the 3GPP has standardized a network structure for the IAB, a protocol for wireless link-based multi-hop transmission, and a physical layer for an access link and a backhaul link to efficiently share radio resources. In particular, the NR-based IAB may be characterized by multi-hop communication, dynamic resource multiplexing of access and backhaul links, plug-and-play-based autonomous backhauling, multi-beam-based cross-link interference technology, and the like. The 3GPP has completed basic standardization works on the network structure, protocol structure, higher layer, and physical layer of the IAB. In addition, the 3GPP is in the process of standardizing additional technologies for the IAB.

SUMMARY

In order to solve the above-identified problems, exemplary embodiments of the present disclosure are directed to providing a method and an apparatus for traffic routing for multi-hop based traffic transmission in an IAB network comprising a plurality of IAB nodes.

According to a first exemplary embodiment of the present disclosure for achieving the above-described objective, an operation method of a boundary IAB node between a first topology and a second topology in a communication system may comprise: receiving, from a first IAB donor node included in the first topology, a first address of a first node included in the second topology; receiving, from a node connected to the boundary IAB node, data including a relay request using a second address as a destination address; rewriting the destination address of the data with the first address indicated by the second address in a mapping table; and routing the data towards the first node.

The first node may be a second IAB donor node of the second topology, the first address may be a first backhaul adaptation protocol (BAP) address of the second IAB donor node, the second address may be a second BAP address of the boundary IAB node in the first topology, the mapping table may include the first BAP address and an index indicating the first BAP address, and the index may be the second BAP address.

The rewriting of the destination address of the data may comprise: obtaining the second BAP address, which is the second address, from the data; identifying the first BAP address indicated by the obtained second BAP from the mapping table; and rewriting the destination address of the data with the first BAP address.

The first node may be a child node of the boundary IAB node, the first address may be a third BAP address of the child node, the second address may be a fourth BAP address of the boundary IAB node in the second topology, the mapping table may include the third BAP address and an index indicating the third BAP address, and the index may be the fourth BAP address.

The rewriting of the destination address of the data may comprise: obtaining the fourth BAP address, which is the second address, from the data; identifying the third BAP address indicated by the obtained fourth BAP address from the mapping table; and rewriting the destination address of the data with the third BAP address.

The first node may be a second IAB donor node of the second topology, the first address may be a first BAP address of the second IAB donor node, the second address may be a first virtual address of the boundary IAB node, the mapping table may include the first BAP address and an index indicating the first BAP address, and the index may be the first virtual address.

The rewriting of the destination address of the data may comprise: obtaining the first virtual address, which is the second address, from the data; identifying the first BAP address indicated by the obtained first virtual address from the mapping table; and rewriting the destination address of the data with the first BAP address.

The first node may be a child node of the boundary IAB node, the first address may be a third BAP address of the child node, the second address may be the second virtual address of the boundary IAB node, the mapping table may include the third BAP address and an index indicating the third BAP address, and the index may be the second virtual address.

The rewriting of the destination address of the data may comprise: obtaining the second virtual address, which is the second address, from the data; identifying the third BAP address indicated by the obtained second virtual address from the mapping table; and rewriting the destination address of the data with the third BAP address.

According to a second exemplary embodiment of the present disclosure for achieving the above-described objective, a boundary IAB node may comprise: a processor; a memory electronically communicating with the processor; and instructions stored in the memory, wherein when executed by the processor, the instructions may cause the boundary IAB node to: receive, from a first IAB donor node included in the first topology, a first address of a first node included in the second topology; receive, from a node connected to the boundary IAB node, data including a relay request using a second address as a destination address; rewrite the destination address of the data with the first address indicated by the second address in a mapping table; and route the data towards the first node.

In the rewriting of the destination address of the data, the instructions may further cause the boundary IAB node to: obtain a second BAP address of the boundary node in the first topology, which is the second address, from the data; identify a first BAP address of a second IAB donor node in the second topology, which is the first address indicated by the obtained second BAP, from the mapping table; and rewrite the destination address of the data with the first BAP address.

In the rewriting of the destination address of the data, the instructions may further cause the boundary IAB node to: obtain a fourth BAP address of the boundary IAB node in the second topology, which is the second address, from the data; identify a third BAP address of a child node of the boundary IAB node, which is indicated by the obtained fourth BAP address, from the mapping table; and rewrite the destination address of the data with the third BAP address.

According to the present disclosure, a boundary IAB node located at a boundary between a first topology and a second topology configured around different IAB donors can receive data from an upper IAB node located in the first topology and deliver the data to a lower IAB node located in the second topology. In addition, according to the present disclosure, the boundary IAB node located at the boundary between the first topology and the second topology configured around different IAB donors can receive data from a lower IAB node located in the first topology and deliver the data to an upper IAB node located in the second topology. In this case, the boundary IAB node may configure a mapping table for mapping an address of the lower IAB node to an address of the boundary IAB node and perform routing on the data with reference to the mapping table, thereby preventing a collision between routing tables configured based on the first topology and the second topology. In addition, the boundary IAB node may configure a mapping table for mapping a virtual address of the lower IAB node to an actual address of the lower IAB node and perform routing on the data with reference to the mapping table, thereby preventing a collision between routing tables configured based on the first topology and the second topology.

BRIEF DESCRIPTION OF DRAWINGS

FIG. 4 is a conceptual diagram illustrating a first exemplary embodiment of a BAP PDU.

FIG. 5 is a conceptual diagram illustrating a second exemplary embodiment of a BAP PDU.

FIG. 6 is a conceptual diagram illustrating a first exemplary embodiment of a process for uplink transmission latency measurement in an IAB network.

FIG. 7 is a conceptual diagram illustrating a second exemplary embodiment of a process for uplink transmission latency measurement in an IAB network.

FIG. 8 is a conceptual diagram illustrating a third exemplary embodiment of a BAP PDU.

FIG. 9 is a conceptual diagram illustrating a fourth exemplary embodiment of a BAP PDU.

FIG. 15 is a conceptual diagram illustrating a fifth exemplary embodiment of a BAP PDU.

FIG. 16 is a conceptual diagram illustrating a sixth exemplary embodiment of a BAP PDU.

DETAILED DESCRIPTION OF THE EMBODIMENTS

Figure 1:
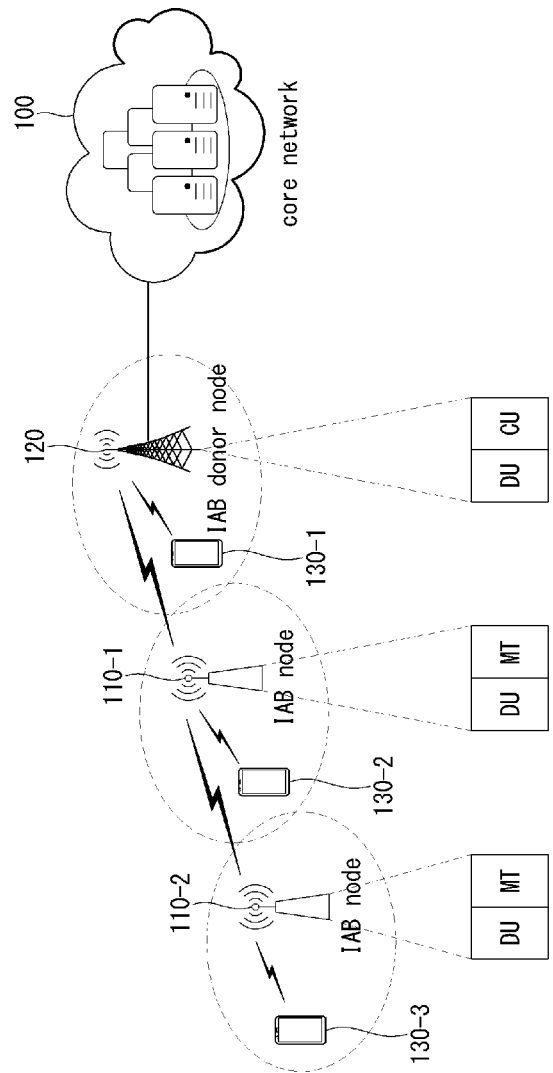
FIG. 1 is a conceptual diagram illustrating a first exemplary embodiment of an IAB network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, beyond 5G (B5G) mobile communication network (e.g., 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of an IAB network.

Referring to FIG. 1, an IAB network may include IAB nodes 110-1 and 110-2, an IAB donor node 120, and terminals 130-1 to 130-3. Here, radio interfaces may be used between the IAB node 110-1 and the IAB donor node 120, between the IAB node 110-1 and the IAB node 110-2, between the IAB node 110-1 or 110-2 and the terminal 130-2 or 130-3, and between the IAB donor node 120 and the terminal 130-1. However, the IAB donor node 120 and a core network 100 may use a wired interface. Here, the IAB nodes 110-1 and 110-2 may be a type of relay or repeater configured based on a fronthaul structure.

Each of the IAB nodes 110-1 and 110-2 may be composed of two elements: an IAB node distributed unit (DU) and an IAB node mobile terminal (MT). In this case, each of the IAB nodes 110-1 and 110-2 may communicate with a child IAB node or a terminal using its IAB node DU. In this case, the child IAB node or the terminal may recognize the corresponding IAB node 110-1 or 110-2 as one cell (serving cell). This may be because the IAB node DU of the IAB node 110-1 or 110-2 and an IAB node MT of the child IAB node or the terminal are connected through an NR Uu interface which is a base station-terminal radio interface. Similarly, the IAB node 110-1 or 110-2 may communicate with a parent IAB node or the IAB donor node 120 through its IAB node MT. In this case, the parent IAB node or the IAB donor node 120 may recognize the IAB node 110-1 or 110-2 as one terminal. This may be because the IAB node MT of the IAB node 110-1 or 110-2 and an IAB node DU of the parent IAB node or an IAB node DU of the IAB donor node 120 are connected through an NR Uu interface which is a base station-terminal radio interface.

Meanwhile, the IAB donor node 120 may be composed of two elements: an IAB donor DU and an IAB donor central unit (CU). In this case, the IAB donor node 120 may communicate with the IAB node 110-1 or the terminal 130-1 using the IAB donor DU. In this case, the IAB node 110-1 or the terminal 130-1 may recognize the IAB donor node 120 as one cell (serving cell). This may be because the IAB donor DU of the IAB donor node 120 and the IAB node MT of the IAB node 110-1 or the terminal 140-1 are connected through an NR Uu interface which is a base station-terminal radio interface. Similarly, the IAB donor node 120 may be connected to the core network 100 using the IAB donor CU. As described above, the IAB network may be composed of the IAB nodes 110-1 and 110-2, the IAB donor node 120, and the terminals 130-1 to 130-3, and data may be transmitted or received through multi-hop connections between these nodes. The IAB donor node 120 may extend its service coverage through the connections with the IAB nodes 110-1 and 110-2. In addition, the IAB donor node 120 may transmit or receive data in a relay form through the IAB nodes 110-1 and 110-2 connected by multi-hop, and may manage or control a topology configured with the IAB nodes 110-1 and 110-2 belonging to the IAB donor node 120. The IAB network may be configured with the topology managed by the IAB donor node 120.

Meanwhile, a base station of a mobile communication system may be functional-split into a central unit (CU) in charge of control and a distribution unit (DU) in charge of data transmission. The purpose of such the functional split is to provide a flexible radio access network (RAN) structure in which functions that require real-time processing, such as scheduling and fast retransmission, are located in the DU, and non-real-time processing and overall control functions are located in the CU. Considering such the flexible base station structure of the mobile communication system, protocol structures for the IAB network may be as shown in FIGS. 2A and 2B.

Figure 2A:
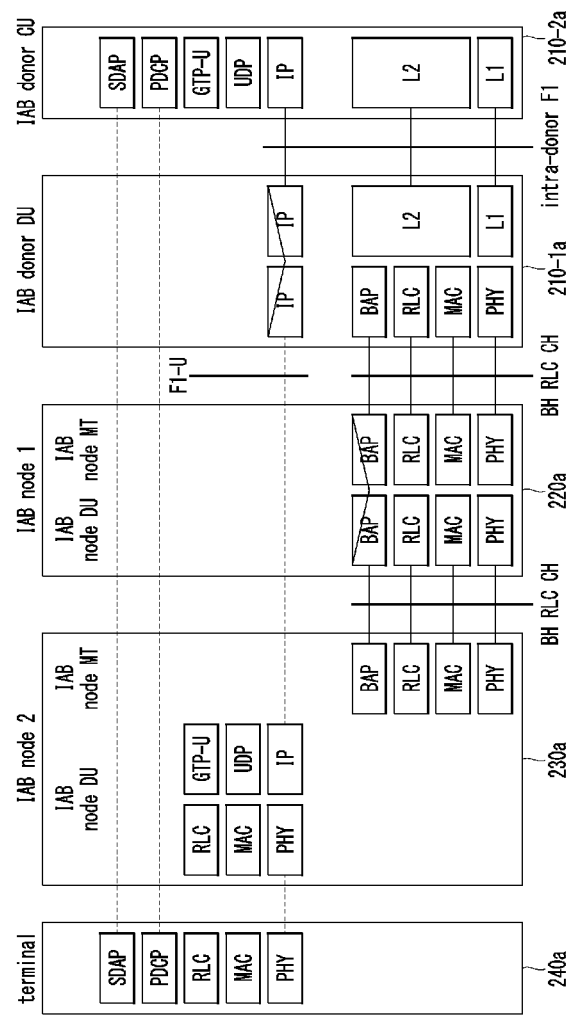
FIG. 2A is a block diagram illustrating a first exemplary embodiment of a user plane protocol structure in the IAB network.
Figure 2B:
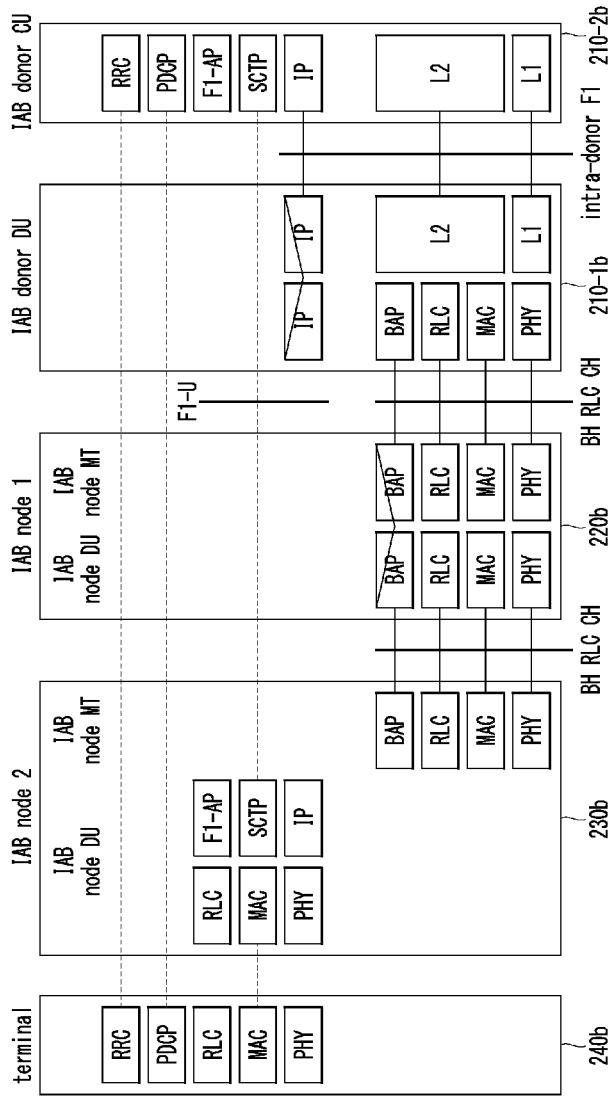
FIG. 2B is a block diagram illustrating a first exemplary embodiment of a control plane protocol structure in the IAB network.

FIG. 2A is a block diagram illustrating a first exemplary embodiment of a user plane protocol structure in the IAB network, and FIG. 2B is a block diagram illustrating a first exemplary embodiment of a control plane protocol structure in the IAB network.

Referring to FIG. 2A, an IAB donor node 210a in the user plane protocol structure in the IAB network may include an IAB donor DU 210-1a and an IAB donor CU 210-2a. Here, the IAB donor DU 210-1a may include a layer 1 (L1) layer, a layer 2 (L2) layer, an Internet protocol (IP) layers, a physical (PHY) layer, a medium access control (MAC) layer, a radio link control (RLC) layer, and a backhaul adaptation protocol (BAP) layer. In addition, the IAB donor CU 210-2a may include an L1 layer, an L2 layer, an IP layer, a user datagram protocol (UDP) layer, a general packet radio service (GPRS) tunneling protocol-user (GTP-U) layer, a packet data convergence protocol (PDCP) layer, and a service data adaptation protocol (SDAP) layer.

Meanwhile, an IAB node 1 220a may include an IAB node DU and an IAB node MT. Here, the IAB node DU of the IAB node 1 may include a PHY layer, a MAC layer, a RLC layer, and a BAP layer. In addition, the IAB node MT of the IAB node 1 may also include a PHY layer, a MAC layer, a RLC layer, and a BAP layer. An IAB node 2 230a may include an IAB node DU and an IAB node MT. Here, the IAB node DU of the IAB node 2 may include an IP layer, a UDP layer, a GTP-U layer, a PHY layer, a MAC layer, and a RLC layer. In addition, the IAB node MT of the IAB node 2 may include a PHY layer, a MAC layer, a RLC layer, and a BAP layer. A terminal 240a may include a PHY layer, a MAC layer, a RLC layer, a PDCP layer, and a SDAP layer.

In the user plane protocol structure of the IAB network, the IAB donor DU 210-2a and the IAB donor CU 210-2a may have an intra-donor F1 interface. In addition, the IAB donor DU 210-1a and the IAB node MT of the IAB node 1 may have a backhaul RLC channel (BH RLC CH). In addition, the IAB node DU of the IAB node 1 and the IAB node MT of the IAB node 2 may have a backhaul RLC channel. In addition, an F1-U interface may be provided between the IAB donor DU 210-1a and the IAB node DU of the IAB node 2.

As described above, in the user plane protocol structure of the IAB network, the IAB donor CU 210-2a may include the SDAP layer and may use the IP layer based on the PDCP layer. In addition, the IAB donor DU 210-1a may include the BAP, RLC, MAC, and PHY layers to deliver data received from the IAB donor CU 210-2a to the IAB node 1 or the IAB node 2. The IAB node 1 located on a multi-hop path of the IAB network may include the BAP layer, RLC layer, MAC layer, and PHY layer in the DU and MT. In addition, the IAB node 2 located on a multi-hop path of the IAB network may include the BAP layer, RLC layer, MAC layer, and PHY layer in the MT. Here, the BAP layer may perform a data relay function between the IAB node 1 and the IAB node 2. In addition, the BAP layer may perform a data relay function between the IAB node 1 and the IAB donor DU 210-1a. The IAB node 2 may deliver user plane data to the terminal 240a by using the GTP-U layer and the UDP layer on the BAP layer of the DU. In this case, the terminal 240a and the IAB node 2 may exchange data at the RLC level.

Meanwhile, referring to FIG. 2B, an IAB donor node 210b in the control plane protocol in the IAB network may include an IAB donor DU 210-1b and an IAB donor CU 210-2b. Here, the IAB donor DU 210-1b may include an L1 layer, an L2 layer, an IP layer, a PHY layer, a MAC layer, a RLC layer, and a BAP layer. In addition, the IAB donor CU 210-2b may include an L1 layer, an L2 layer, an IP layer, a stream control transmission protocol (SCTP) layer, an F1-application protocol (AP) layer, a PDCP layer, and a radio resource control (RRC) layer.

Meanwhile, an IAB node 1 220b may include an IAB node DU and an IAB node MT. Here, the IAB node DU of the IAB node 1 may include a PHY layer, a MAC layer, a RLC layer, and a BAP layer. In addition, the IAB node MT of the IAB node 1 may include a PHY layer, a MAC layer, a RLC layer, and a BAP layer. An IAB node 2 230b may include an IAB node DU and an IAB node MT. Here, the IAB node DU of the IAB node 2 may include an IP layer, a SCTP layer, a F1-AP layer, a PHY layer, a MAC layer, and a RLC layer. In addition, the IAB node MT of the IAB node 2 may include a PHY layer, a MAC layer, a RLC layer, and a BAP layer. A terminal 240b may include a PHY layer, a MAC layer, a RLC layer, a PDCP layer, and a SDAP layer.

In such the control plane protocol structure of the IAB network, the IAB donor DU 210-1b and the IAB donor CU 210-2b may have an intra donor F1 interface. In addition, a backhaul RLC channel may be provided between the IAB donor DU 210-1b and the IAB node MT of the IAB node1. In addition, a backhaul RLC channel may also be provided between the IAB node DU of the IAB node 1 and the IAB node MT of the IAB node 2. In addition, an F1-U interface may be provided between the IAB donor DU 210-1b and the IAB node DU of the IAB node 2.

As described above, in the control plane protocol structure of the IAB network, the IAB donor CU 210-2b may include the RRC layer and may use the IP layer based on the PDCP layer. In addition, the IAB donor DU 210-1b may include the BAP layer, RLC layer, MAC layer, and PHY layer to deliver data received from the IAB donor CU 210-2b to the IAB node 1 or the IAB node 2. The IAB node 1 located on a multi-hop path of the IAB network may include the BAP layer, RLC layer, MAC layer, and PHY layer in the DU and MT. In addition, the IAB node 2 located on a multi-hop path of the IAB network may include the BAP layer, RLC layer, MAC layer, and PHY layer in the MT. Here, the BAP layer may perform a data relay function between the IAB node 1 and the IAB node 2. In addition, the BAP layer may perform a data relay function between the IAB node 1 and the IAB donor DU 210-1*b*. The IAB node 2 may deliver control plane data to the terminal 240*b* by using the F1-AP layer and the SCTP layer on the BAP layer of the DU. In this case, the terminal 240*b* and the IAB node 2 may exchange data at the RLC level.

Meanwhile, in the IAB network, the IAB donor node may configure a routing table in each IAB node to configure a path for data transmission. In this case, the IAB donor node may configure the routing table for data transmission and data reception in each IAB node by using a configuration message. Accordingly, the IAB node may route packets by referring to the routing table configured by the IAB donor node and information of a header of a BAP packet data unit (PDU). The IAB network may configure a basic path for transmitting or receiving packets by using the BAP PDU header information based on the routing table. In this case, the BAP layer may configure a basic path for transmitting or receiving packets. Such the routing table may basically include an IAB address for identifying an IAB node and a path identifier for identifying a specific path. In this case, a routing identifier may be a combination of an IAB address and a path identifier.

Meanwhile, the IAB network may transmit packets between the IAB nodes or between the IAB donor node and the IAB node through a backhaul link. In this case, the IAB network may distinguish and transmit packets through logical channels. In this case, the logical channels may be classified into an ingress backhaul RLC channel and an egress backhaul RLC channel. Each backhaul RLC channel may include information such as quality of service (QoS) information of traffic to be transmitted. Accordingly, the IAB node or the IAB donor DU may utilize QoS information of traffic to set a priority of transmission when transmitting a BAP PDU. The ingress backhaul RLC channel and egress backhaul RLC channel may be configured by the IAB donor CU of each topology. These configurations may be managed as a mapping table in each IAB node and IAB donor DU.

In the IAB network, the IAB donor node may control routing for packet transmission or packet reception of all IAB nodes included in the IAB network. To this end, the IAB donor CU may configure routing tables of DUs and MTs of the IAB nodes using the F1-AP layer and the RRC layer, and may configure the backhaul RLC channels. In addition, the IAB donor CU may configure the routing table of the IAB donor DU using the F1-AP layer and may configure the backhaul RLC channel.

Figure 3:
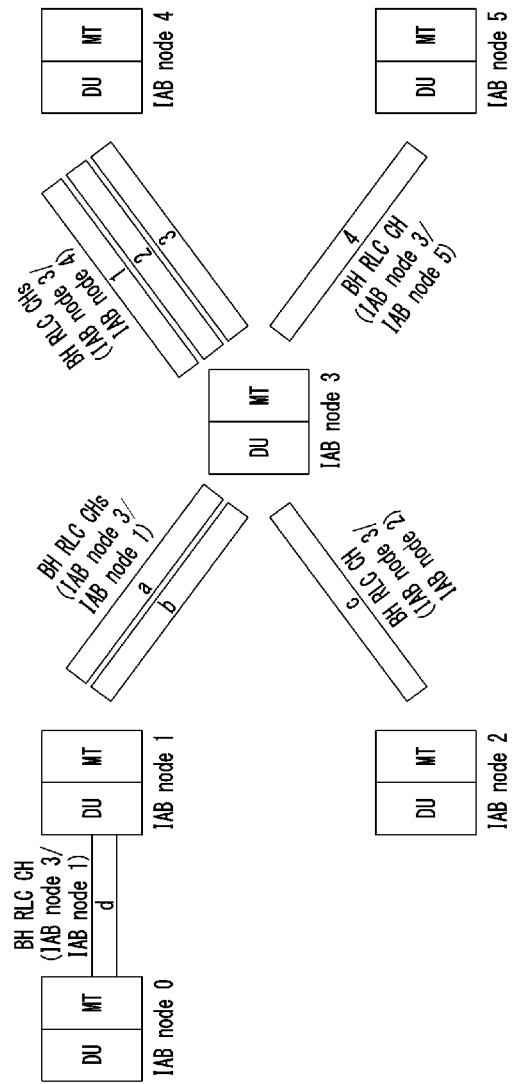
FIG. 3 is a conceptual diagram illustrating a first exemplary embodiment of downlink data routing in the IAB network.

FIG. 3 is a conceptual diagram illustrating a first exemplary embodiment of downlink data routing in the IAB network.

Referring to FIG. 3, an IAB network may be composed of six IAB nodes (i.e., IAB nodes 0 to 5). In such the IAB network, the IAB node 4 may transmit a packet destined for the IAB node 0. In this case, the IAB node 3 may configure a link with the IAB node 4, and may receive the packet transmitted from the IAB node 4 and relay the received packet to the IAB node 1. In addition, the IAB node 1 may configure a link with the IAB node 3, may receive the packet transmitted from the IAB node 3, and relay the received packet to the IAB node 0. Meanwhile, the IAB node 5 may transmit a packet destined for the IAB node 2. In this case, the IAB node 3 may configure a link with the IAB node 5, receive the packet transmitted from the IAB node 5, and relay the received packet to the IAB node 2.

Meanwhile, there may be three backhaul RLC channels (i.e., BH RLC CH 1, BH RLC CH 2, BH RLC CH 3) between the IAB node 3 and the IAB node 4. In addition, there may be one backhaul RLC channel (BH RLC CH 4) between the IAB node 3 and the IAB node 5. In addition, there may be two backhaul RLC channels (i.e., BH RLC CH a, BH RLC CH b) between the IAB node 1 and the IAB node 3. In addition, there may be one backhaul RLC channel (i.e., BH RLC CH c) between the IAB node 2 and the IAB node 3. In addition, there may be one backhaul RLC channel (i.e., BH RLC CH d) between the IAB node 0 and the IAB node 1. In this case, a routing table of the IAB node 3 may be as shown in Table 1, and a backhaul RLC channel mapping table thereof may be as shown in Table 2.

TABLE 1

| BAP address | path identifier | next hop BAP address |
| --- | --- | --- |
| 1 | 1 | 1 |
| 0 | 1 | 1 |
| 2 | 1 | 2 |

TABLE 2

| ingress BH RLC CH index | egress BH RLC CH index |
| --- | --- |
| ingress BH RLC CH 1 | egress BH RLC CH a |
| ingress BH RLC CH 2 | egress BH RLC CH a |
| ingress BH RLC CH 3 | egress BH RLC CH b |
| ingress BH RLC CH 4 | egress BH RLC CH c |

In such the routing table, the first entry may indicate to forward a packet indicating a BAP address 1 as a destination IAB node and having a path identifier 1 to the IAB node 1. In addition, the second entry may indicate to forward a packet indicating a BAP address 0 as a destination IAB node and having a path identifier 1 to the IAB node 1. In addition, the third entry may indicate to forward a packing indicating a BAP address 2 as a destination IAB node and having a path identifier 1 to the IAB node 2.

Meanwhile, in the backhaul RLC channel mapping table, the first entry may indicate to map an egress BH RLC CH of a packet to the BH RLC CH a when an ingress BH RLC CH of the packet is the BH RLC CH 1. In addition, the second entry may indicate to map an egress BH RLC CH of a packet to the BH RLC CH a when an ingress BH RLC CH of the packet is the BH RLC CH 2. In addition, the third entry may indicate to map an egress BH RLC CH of a packet to the BH RLC CH b when an ingress BH RLC CH of the packet is the BH RLC CH 3. In addition, the fourth entry may indicate to map an egress BH RLC CH of a packet to the BH RLC CH c when an ingress BH RLC CH of the packet is the BH RLC CH 4.

When a BAP address of a BAP PDU received from the IAB node 4 is 1 and a path identifier thereof is 1, the IAB node 3 may forward the BAP PDU to the IAB node 1. In this case, the IAB node 3 may transmit BAP PDUs received through the ingress BH RLC CH 1 and the ingress BH RLC CH 2 to the IAB node 1 through the egress BH RLC CH a with reference to the backhaul RLC channel mapping table. Also, the IAB node 3 may transmit a BAP PDU received through the ingress BH RLC CH 3 to the IAB node 1 through the egress BH RLC CH b with reference to the backhaul RLC channel mapping table. Meanwhile, when a BAP address of a BAP PDU received from the IAB node 5 is 2 and a path identifier thereof is 1, the IAB node 3 may forward the BAP PDU to the IAB node 2. In this case, the IAB node 3 may transmit a BAP PDU received through the ingress BH RLC CH 4 to the IAB node 2 through the egress BH RLC CH c with reference to the backhaul RLC channel mapping table.

FIG. 4 is a conceptual diagram illustrating a first exemplary embodiment of a BAP PDU.

Referring to FIG. 4, a BAP PDU may include a header comprising a D/C field indicating whether it is a data PDU or a control PDU, a destination field indicating a BAP address of a destination IAB node or a destination IAB donor DU, and a path field including a path identifier. In addition, the BAP PDU may include a payload for transmitting data. Here, the header of the BAP PDU may further include a hop count in consideration of a delay due to multi-hop transmission and a QoS of transmitted/received traffic.

Here, the hop count may mean the number of transmission sections between the IAB nodes or between the IAB node and the IAB donor DU. Referring to FIG. 3, the IAB node 0 and the IAB node 4 may exchange data through three hops. Accordingly, the hop count may be set to 3. The hop count may be included in the header of the BAP PDU. In this case, the IAB node (in case of uplink) or the IAB donor (in case of downlink) that initiates data transmission in the IAB network may transmit a packet by setting the allowable number of hops in header of the BAP PDU. Then, after receiving the BAP PDU, each of the IAB nodes on a transmission path may transmit the BAP PDU by subtracting the set hop count by one when transmitting the BAP PDU to the next IAB node.

In this case, the IAB node may receive a BAP PDU including a hop count set to 0. Then, since the IAB node does not satisfy a transmission latency requirement for the corresponding BAP PDU, the IAB node may lower a transmission priority of the BAP PDU. Alternatively, since the IAB node does not satisfy the transmission latency requirement for the corresponding BAP PDU, the IAB node may discard the BAP PDU. In particular, when a congestion occurs in the IAB network, the IAB node may reduce the congestion by selectively transmitting or discarding BAP PDUs. For example, referring again to FIG. 3, the backhaul RLC channel 1 of the IAB node 4 may have a hop count of 2. In this case, the IAB node 4 may transmit a BAP PDU including a hop count of 2 to the IAB node 3.

Then, the IAB node 3 may receive the BAP PDU including the hop count of 2 from the IAB node 4 and may decrease the hop count of the received BAP PDU to 1. The IAB node 3 may transmit the BAP PDU including the hop count of 1 to the IAB node 1. Then, the IAB node 1 may receive the BAP PDU including the hop count of 1 from the IAB node 3 and may decrease the hop count of the received BAP PDU to 0. Accordingly, the IAB node 1 may determine that a transmission latency for the BAP PDU exceeds a requirement, and may lower a transmission priority of the BAP PDU or may discard the BAP PDU.

On the other hand, in the IAB network, the IAB node (in case of uplink) or IAB donor node (in case of downlink) may initially set the hop count to 0. When the IAB node receives a BAP PDU and transmits it to the next IAB node or the IAB donor node, the IAB node may increase the hop count of a header of the BAP PDU by one, and transmit the BAP PDU. In this case, the IAB node or the IAB donor DU may lower a transmission priority of the BAP PDU or discard it if it has the hop count higher than a set maximum hop count. The hop count may be set by a node that initiates BAP PDU transmission for each routing identifier (including a BAP address and path identifier of the destination IAB node or IAB node DU) or for each configured backhaul RLC channel. In this case, the IAB donor CU may provide necessary information to the corresponding IAB node.

Meanwhile, the IAB network may measure a transmission latency between the IAB nodes or between the IAB node and the IAB donor node in order to process a traffic sensitive to a transmission latency by using the hop count. The IAB network may measure a transmission latency on each hop or on a specific path. The IAB network may use a control PDU for transmission latency measurement between the IAB nodes or between the IAB node and the IAB donor node. In order to measure an uplink transmission latency, a MT of a child IAB node may generate and transmit a control PDU for transmission latency measurement based on a time of a DU of a parent IAB node or a DU of the IAB donor node. Accordingly, the DU of the parent IAB node or the DU of the IAB donor node may receive the control PDU and calculate a time consumed for transmission of the received control PDU in the corresponding hop.

In order to measure a downlink transmission latency, a DU of a parent IAB node may generate and transmit a control PDU for transmission latency measurement based on a time of the DU of the parent IAB node or a DU of the IAB donor node. Accordingly, a MT of a child IAB node may receive the control PDU from the DU of the parent IAB node, and may calculate a time consumed for transmission of the received control PDU in the corresponding hop. In this case, a transmission latency on a path having multiple hops may be derived by summing transmission latencies measured by the respective IAB nodes at the respective hops on the path.

FIG. 5 is a conceptual diagram illustrating a second exemplary embodiment of a BAP PDU.

Referring to FIG. 5, a BAP PDU, as a BAP control PDU, may include a D/C field, a PDU type field, a source field, a source path field (S), a destination path field (D), a destination field, a timestamp field, and an accumulated delay field. The characteristics thereof may be as follows.

Source field: A BAP address of an IAB node or IAB donor DU that initiates transmission on a path for transmission latency measurement Path field S: A path identifier of the IAB node or IAB donor DU that initiates transmission on the path for transmission latency measurement Destination field: A BAP address of an IAB node or IAB donor DU that terminates transmission on the path for transmission latency measurement Path field D: A path identifier of the IAB node or IAB donor DU that terminates transmission on the path for transmission latency measurement Time stamp field: Information on a time point at which each IAB node or IAB donor DU located on the path for transmission latency measurement transmits the BAP control PDU Accumulated latency field: Information on a time accumulatively consumed on the path for transmission latency measurement After measuring the transmission latency on the path, the IAB nodes may transmit the calculated inter-hop transmission latency to the IAB donor CU. Then, the IAB donor CU may set a hop count by considering allowable transmission for each traffic based on the collected inter-hop transmission latency or transmission latency on the path.

FIG. 6 is a conceptual diagram illustrating a first exemplary embodiment of a process for uplink transmission latency measurement in an IAB network.

Referring to FIG. 6, an IAB network may include an IAB node 1, an IAB node 2, an IAB node 3, and an IAB donor DU. Under control of an IAB donor CU, the IAB node 1 may transmit a BAP control PDU to the IAB node 2 at a time 1004. In this case, the IAB node 1 may transmit by setting a time stamp of the BAP control PDU to 1004. The IAB node 2 may receive the BAP control PDU from the IAB node 1 at a time 1010. Then, the IAB node 2 may transmit the received BAP control PDU to the IAB node 3 at a time 1011. In this case, the IAB node 2 may set the time stamp of the BAP control PDU to 1011, and may set an accumulated latency thereof to 7. In this case, the accumulated latency may be a difference between the time stamp (i.e., 1004) transmitted by the IAB node 1 and the time (i.e., 1011) when the IAB node 2 transmits the BAP control PDU received from the IAB node 1 to the next IAB node. By repeatedly performing the above process, the IAB donor DU may receive the BAP control PDU transmitted from the IAB node 1. Then, the IAB donor DU may infer a transmission latency of the corresponding path to be 28.

FIG. 7 is a conceptual diagram illustrating a second exemplary embodiment of a process for uplink transmission latency measurement in an IAB network.

Referring to FIG. 7, an IAB network may include an IAB node 1, an IAB node 2, an IAB node 3, and an IAB donor DU. Under control of an IAB donor CU, the IAB node 1 may transmit a BAP control PDU to the IAB node 2 at a time 1004. In this case, the IAB node 1 may transmit by setting a time stamp of the BAP control PDU to 1004. The IAB node 2 may receive the BAP control PDU from the IAB node 1 at a time 1010. Then, the IAB node 2 may transmit the received BAP control PDU to the IAB node 3 at a time 1011. In this case, the IAB node 2 may set the time stamp of the BAP control PDU to 1011, and may set an accumulated latency thereof to 6. In this case, the accumulated latency may be a difference between the time stamp (i.e., 1004) transmitted by the IAB node 1 and the time (i.e., 1010) when the IAB node 2 receives the BAP control PDU from the IAB node 1. By repeatedly performing the above process, the IAB donor DU may receive the BAP control PDU transmitted from the IAB node 1. Then, the IAB donor DU may infer a transmission latency of the corresponding path to be 25. Here, the accumulated latency may be based on the reception time of the next hop from the transmission time of the BAP control PDU. Accordingly, the accumulated latency may be different from the accumulated latency of FIG. 6 based on the transmission time of the next hop from the transmission time of the BAP control PDU.

The IAB donor CU may use the measured transmission latency as data for path configuration in the corresponding topology. Also, the IAB donor CU may infer a transmission latency averaged for each hop included in the path by using the measured transmission latency. Also, the IAB donor CU may utilize the inferred transmission latency for hop count setting. As an example, in FIG. 6, the IAB donor CU may infer a transmission latency of a path consisting of three hops from the IAB node 1 to the IAB donor DU to be 28. In this case, the IAB donor CU may calculate the average transmission latency per hop as 9.3. In this case, it may be assumed that a required transmission latency of data transmitted by the IAB node 1 through a specific backhaul RLC channel on the link of the IAB node 2 is 38 ms or less. Then, the IAB node 1 may transmit packets by setting the hop count of BAP PDUs to 4.

FIG. 8 is a conceptual diagram illustrating a third exemplary embodiment of a BAP PDU.

A BAP PDU shown in FIG. 8 may be a BAP PDU for packet routing based on hop counts. Referring to FIG. 8, the BAP PDU may include a D/C field, a destination field, a source path field (S), a destination path field (D), a hop count field, and a data field.

The IAB network may route packets based on an allowable latency. Such the routing scheme may be referred to as an allowable latency-based packet routing scheme. In the allowable latency-based packet routing scheme, the IAB node (in case of uplink) or the IAB donor (in case of downlink) that initiates data transmission may transmit a BAP PDU by setting an allowable packet transmission delay budget (PDB) based on a PDB indicated by a 5G QoS identifier (QI) in a header of the BAP PDU.

Then, after receiving the BAP PDU, each of the IAB nodes on the transmission path may record a value remained after subtracting a time consumed for transmission of the BAP PDU in the header of the BAP PDU, and transmit the BAP PDU header to the next IAB node. In this case, the time consumed for transmission may include a time for receiving the BAP PDU and a processing time for transmitting the BAP PDU to the next IAB node. In the allowable latency-based packet routing scheme, the IAB node or the IAB donor DU may lower a transmission priority of the corresponding BAP PDU or discard it when the set allowable packet transmission delay budget is less than or equal to 0.

FIG. 9 is a conceptual diagram illustrating a fourth exemplary embodiment of a BAP PDU.

A BAP PDU shown in FIG. 9 may be a BAP PDU for allowable latency-based packet routing. The BAP PDU may include the following fields.

Time stamp field: Information on a time at which each IAB node or IAB donor DU located on a transmission path transmits the BAP PDU Allowable packet transmission delay budget field: Allowable packet transmission delay budget information of traffic transmitted through a backhaul RLC channel FIG. 10 is a conceptual diagram illustrating a first exemplary embodiment of an allowable latency-based packet routing method in the IAB network.

Figure 10:
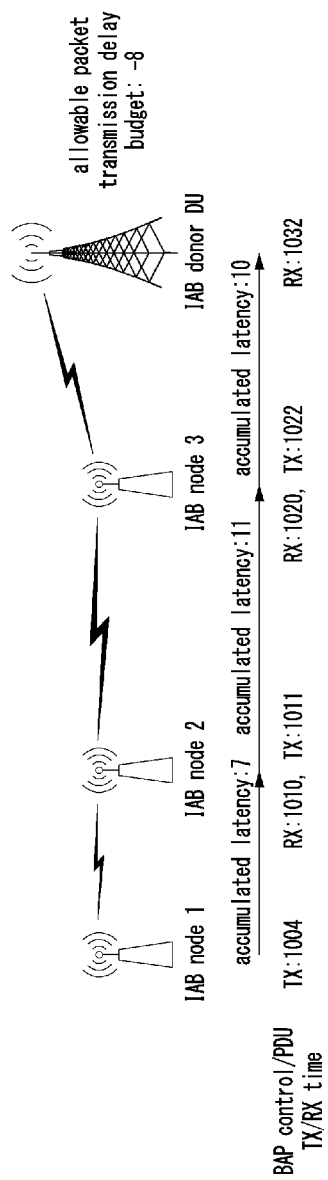
FIG. 10 is a conceptual diagram illustrating a first exemplary embodiment of an allowable latency-based packet routing method in the IAB network.

Referring to FIG. 10, in an allowable latency-based packing routing method, an IAB node 1 may set a time stamp of a BAP PDU to 1004 and set an allowable packet transmission delay budget thereof to 20. Under control of an IAB donor CU, the IAB node 1 may transmit the BAP PDU including the allowable packet transmission delay budget set to 20 to an IAB node 2 at a time 1004. Accordingly, the IAB node 2 may receive the BAP PDU from the IAB node 1 at a time 1010.

Meanwhile, the IAB node 2 may set the time stamp of the BAP PDU to 1011 and set the allowable packet transmission delay budget to 13. The IAB node 2 may set the allowable packet transmission delay budget by excluding a time consumed for transmitting the BAP PDU received from the IAB node 1 to a next IAB node. That is, the IAB node 2 may set the value 13 obtained by subtracting the accumulated latency 7 from the allowable packet transmission delay budget 20 of the BAP PDU received from the IAB node 1 as the new allowable packet transmission delay budget. The IAB node 2 may transmit the received BAP PDU to the IAB node 3 at a time 1011. The IAB node 3 may receive the BAP PDU from the IAB node 2 at a time 1020.

Then, the IAB node 3 may set the time stamp of the BAP PDU to 1022 and set the allowable packet transmission delay budget to 2. The IAB node 3 may set the allowable packet transmission delay budget by excluding a time consumed for transmitting the BAP PDU received from the IAB node 2 to a next IAB node. That is, the IAB node 3 may set the value 2 obtained by subtracting the accumulated latency 11 from the allowable packet transmission delay budget 13 of the BAP PDU received from the IAB node 2 as the new allowable packet transmission delay budget. The IAB node 3 may transmit the received BAP PDU to the IAB donor DU at a time 1022. The IAB donor DU may receive the BAP PDU from the IAB node 3 at a time 1032.

The IAB donor DU may set the allowable packet transmission delay budget for the BAP PDU received from the IAB node 3. That is, the IAB donor DU may set a value −8 obtained by subtracting the accumulated latency 10 from the allowable packet transmission delay budget 2 of the BAP PDU received from the IAB node 3 as the new allowable packet transmission latency budget. Accordingly, the IAB donor DU may infer that the transmission latency required for the BAP PDU is not satisfied after receiving the BAP PDU from the IAB node 3.

Meanwhile, the IAB network may have a scheme of transmitting or receiving data within one IAB donor node and a scheme of transmitting or receiving data between one or more IAB donor nodes. Here, the scheme of transmitting or receiving data within one IAB donor node may be an intra-topology packet routing scheme. In addition, the scheme of transmitting or receiving data between one or more IAB donor nodes may be an inter-topology packet routing scheme.

In such the inter-topology packet routing scheme, topology redundancy or partial migration considering topology migration between the IAB donor nodes may be considered in order to increase reliability of a path.

Figure 11:
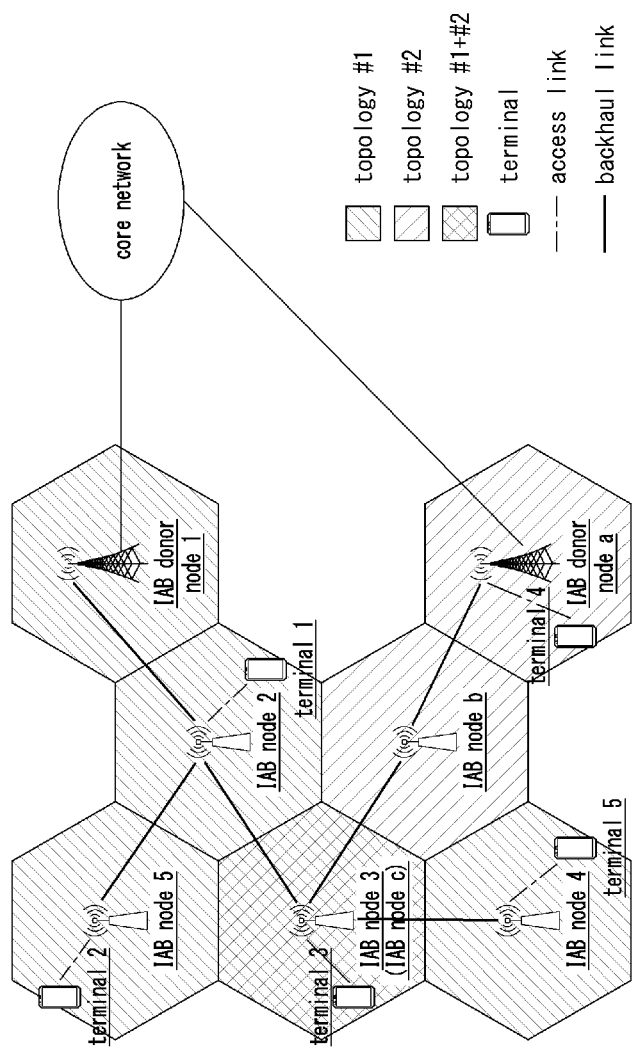
FIG. 11 is a conceptual diagram illustrating a first exemplary embodiment of an inter-topology packet routing system in the IAB network.

FIG. 11 is a conceptual diagram illustrating a first exemplary embodiment of an inter-topology packet routing system in the IAB network.

Referring to FIG. 11, in an inter-topology packet routing system, a topology #1 may initially be composed of an IAB donor node 1, IAB node 2, IAB node 3, IAB node 4, and IAB node 5. A topology #2 may be composed of an IAB donor node a and IAB node b. Initially, the topology #1 and the topology #2 may be configured as independent topologies, and may be configured or managed by each IAB donor node. Thereafter, the IAB node 3 of the topology #1 may access the IAB node b included in the topology #2 of the IAB donor node a due to an event such as movement. In this case, the IAB network may be changed to a form in which the topology #1 and the topology #2 are connected to each other. In this case, the IAB node 3 of the topology #1 may be recognized as an IAB node c of the topology #2. Accordingly, the IAB node 3 may route data to the IAB nodes included in the topology #1 and the topology #2.

In particular, in this type of topology, the IAB network may define an IAB donor CU located at a termination point of an F1 connection as an F1-terminated CU, and may define an IAB donor CU that only provides a path of a topology as a non-F1-terminated CU. In addition, an IAB donor DU located at a termination point of an F1 connection may be defined as an F1-terminated DU, and an IAB donor DU that provides only a path of a topology may be defined as a non-F1-terminated DU. Here, the F1-terminated CU and the F1-terminated DU may be referred to as an F1-terminated donor. In addition, the non-F1-terminated CU and the non-F1-terminated DU may be referred to as a non-F1-terminated donor. In FIG. 11, the IAB donor node 1 may be an F1-terminated donor node, and the IAB donor node a may be a non-F1-terminated donor node. In addition, the IAB network may define an IAB node that can be connected to two different topologies as a boundary IAB node. In FIG. 11, the IAB node 3 may be a boundary IAB node.

In such the situation, the IAB node 3 may route packets by simultaneously using a path provided by the topology #1 and a path provided by the topology #2 in order to provide services to the terminal 3. However, in this case, the topology #1 and the topology #2 may be managed by each IAB donor node configuring and managing a routing table thereof. Accordingly, a collision between information of address and routing tables may occur in the IAB node 3. Here, the IAB node 2 may provide services to a terminal 1, the IAB node 5 may provide services to a terminal 2, the IAB donor node a may provide services to a terminal 4, and the IAB node 4 may provide services to s terminal 5.

Figure 12:
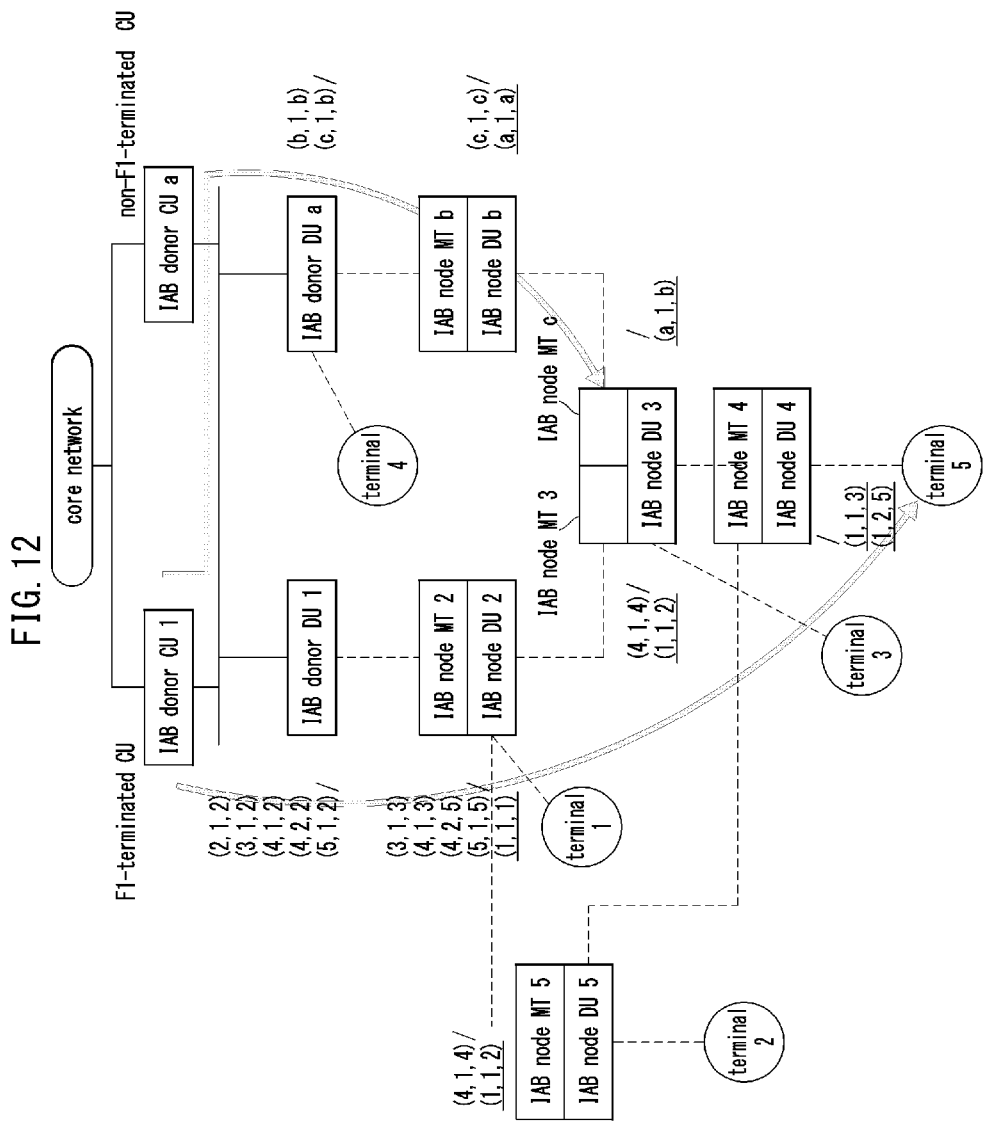
FIG. 12 is a conceptual diagram illustrating a first exemplary embodiment of a method for configuring routing tables in the system of FIG. 11.

FIG. 12 is a conceptual diagram illustrating a first exemplary embodiment of a method for configuring routing tables in the system of FIG. 11.

Referring to FIG. 12, the IAB node or IAB donor DU may configure a routing table by generating entries each comprising a BAP address, a path identifier, and a BAP address of a next hop. Here, the entry of the routing table may be expressed using parentheses. The parentheses may contain the BAP address, the path identifier, and the BAP address of the next hop. As an example, the IAB donor DU 1 may have an entry indicated by (2,1,2) in its routing table, where '2' may be a BAP address, '1' may be a path identifier, and '2' may be a BAP address of a next hop. Here, an entry of a downlink routing table may not have an underline below it, and an entry of an uplink routing table may have a single underline below it. For example, the IAB donor DU 1 may have five routing entries (2, 1, 2), (3, 1, 2), (4, 1, 2), (4, 2, 2) and (5, 1, 2) in the downlink routing table. However, the IAB donor DU 1 may not have routing entries in the uplink routing table. In contrast, the IAB node 3 may have a routing entry of (4, 1, 4) in its downlink routing table, and may have a routing entry of (1, 1, 2) in its uplink routing table. The IAB node 3 in the topology managed by the IAB donor CU 1 may be recognized by a different BAP address and a different path identifier in the topology managed by the IAB donor CU a. For example, the address of the IAB node recognized as 3 in the topology of the F1-terminated CU may be recognized as c in the topology of the non-F1-terminated CU. Accordingly, the IAB node 3 may be a boundary IAB node.

In such the situation, the boundary IAB node may perform data routing between the topology managed by the F1-terminated CU and the topology managed by the non-F1-terminated CU. In this scheme, after the F1-terminated CU obtains the address of the boundary IAB node assigned by the non-F1-terminated CU, the F1-terminated CU may transmit data to the corresponding node. Then, the boundary IAB node may overwrite BAP header information of the data to be transmitted with the address of the IAB node or the IAB donor that is actually received, and transmit the data. Such the boundary IAB node may be characterized by multi-hop communication, dynamic resource multiplexing of an access link and a backhaul link, plug-and-play-based autonomous backhauling, and multi-beam-based cross-link interference technology.

Figure 13:
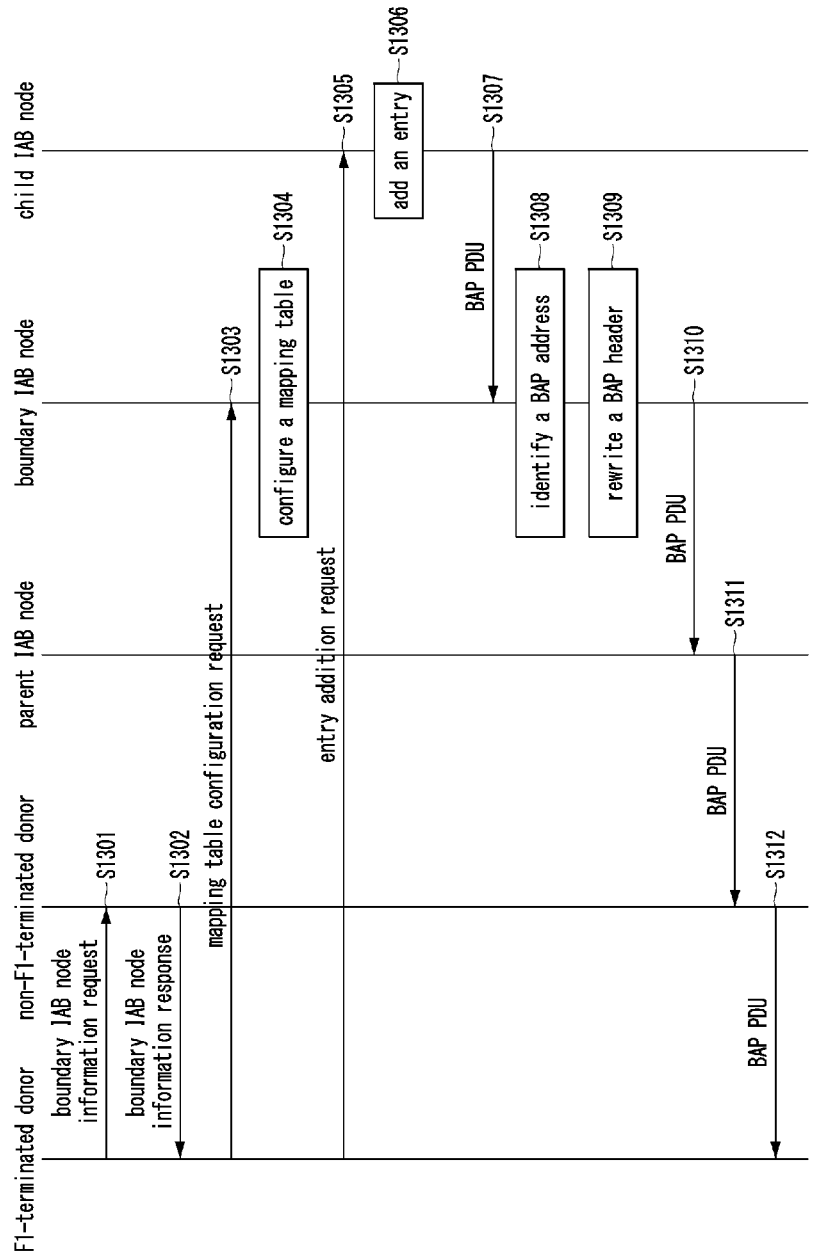
FIG. 13 is a sequence chart illustrating a first exemplary embodiment of an uplink traffic routing method in the IAB network.

FIG. 13 is a sequence chart illustrating a first exemplary embodiment of an uplink traffic routing method in the IAB network.

Referring to FIG. 13, in an uplink traffic routing method, an F1-terminated donor node may transmit a boundary IAB node information request signal for requesting a BAP address and a path identifier of a boundary IAB node to a non-F1-terminated donor node (S1301). Then, the non-F1-terminated donor node may receive, from the F1-terminated donor node, the boundary IAB node information request signal for requesting a BAP address and a path identifier of a boundary IAB node. Accordingly, the non-F1-terminated donor node may transmit a boundary IAB node information response signal including a BAP address and a path identifier of a boundary IAB node to the F1-terminated donor node (S1302). Then, the F1-terminated donor node may receive the boundary IAB node information response signal including the BAP address and path identifier of the boundary IAB node from the non-F1-terminated donor node, and identify the BAP address and path identifier of the boundary IAB node.

In this case, the F1-terminated donor node may know a BAP address and a path identifier of the non-F1-terminated donor node. For example, the F1-terminated donor node may request the BAP address and the path identifier of the non-F1-terminated donor node from the non-F1-terminated donor node, and may identify the BAP address and the path identifier of the non-F1-terminated donor node by receiving the BAP address and the path identifier of the non-F1-terminated donor node transmitted from the non-F1-terminated donor node in response to the request.

Thereafter, the F1-terminated donor node may request the boundary IAB node to configure a reconfiguration mapping table for BAP header reconfiguration by transmitting the BAP address and the path identifier of the non-F1-terminated donor node to the boundary IAB node (S1303). The boundary IAB node may receive the request for configuring the reconfiguration mapping table for BAP header reconfiguration from the F1-terminated donor node. Accordingly, the boundary IAB node may configure the reconfiguration mapping table (S1304). In this case, the reconfiguration mapping table may include a BAP address, a path identifier, and an index indicating the corresponding information for the non-F1-terminated donor node in the topology managed by the non-F1-terminated donor node. Here, the index indicating the corresponding information may be the address of the boundary IAB node in the F1-terminated topology.

Then, the F1-terminated donor node may request a child IAB node of the boundary IAB node to add an entry destined for the boundary IAB node in its routing table (S1305). Then, the child IAB node may receive, from the F1-terminated donor node, the request for adding an entry destined for the boundary IAB node in the routing table. Accordingly, the child IAB node may add an entry destined for the boundary IAB node in the routing table (S1306).

On the other hand, the child IAB node of the boundary IAB node may set a destination address of a header of a BAP PDU to the boundary IAB node when transmitting F1-C traffic/F1-U tunnel data using the non-F1-terminated topology, and transmit the BAP PDU (S1307). Then, the boundary IAB node may receive the BAP PDU having the boundary IAB node as the destination address from the child IAB node. Accordingly, the boundary IAB node may obtain the destination address from the BAP PDU received from the child IAB node. The boundary IAB node may identify a destination BAP address indicated by an index corresponding to the destination address of the corresponding data in the reconfiguration mapping table (S1308).

Then, the boundary IAB node may rewrite the destination address of the BAP header of the BAP PDU received from the child IAB node with the BAP address obtained from the reconfiguration mapping table (S1309). Then, the boundary IAB node may transmit the BAP PDU to a parent IAB node by referring to the rewritten BAP address in the routing table (S1310). Accordingly, the parent IAB node may receive the BAP PDU from the boundary IAB node. Then, the parent IAB node may transmit the BAP PDU to the non-F1-terminated donor node, which is an upper node (S1311). Accordingly, the non-F1-terminated donor node may receive the BAP PDU from the parent IAB node. Thereafter, the non-F1-terminated donor node may transmit the BAP PDU to the F1-terminated donor node (S1312). Accordingly, the F1-terminated donor node may receive the BAP PDU from the non-F1-terminated donor node.

Figure 14:
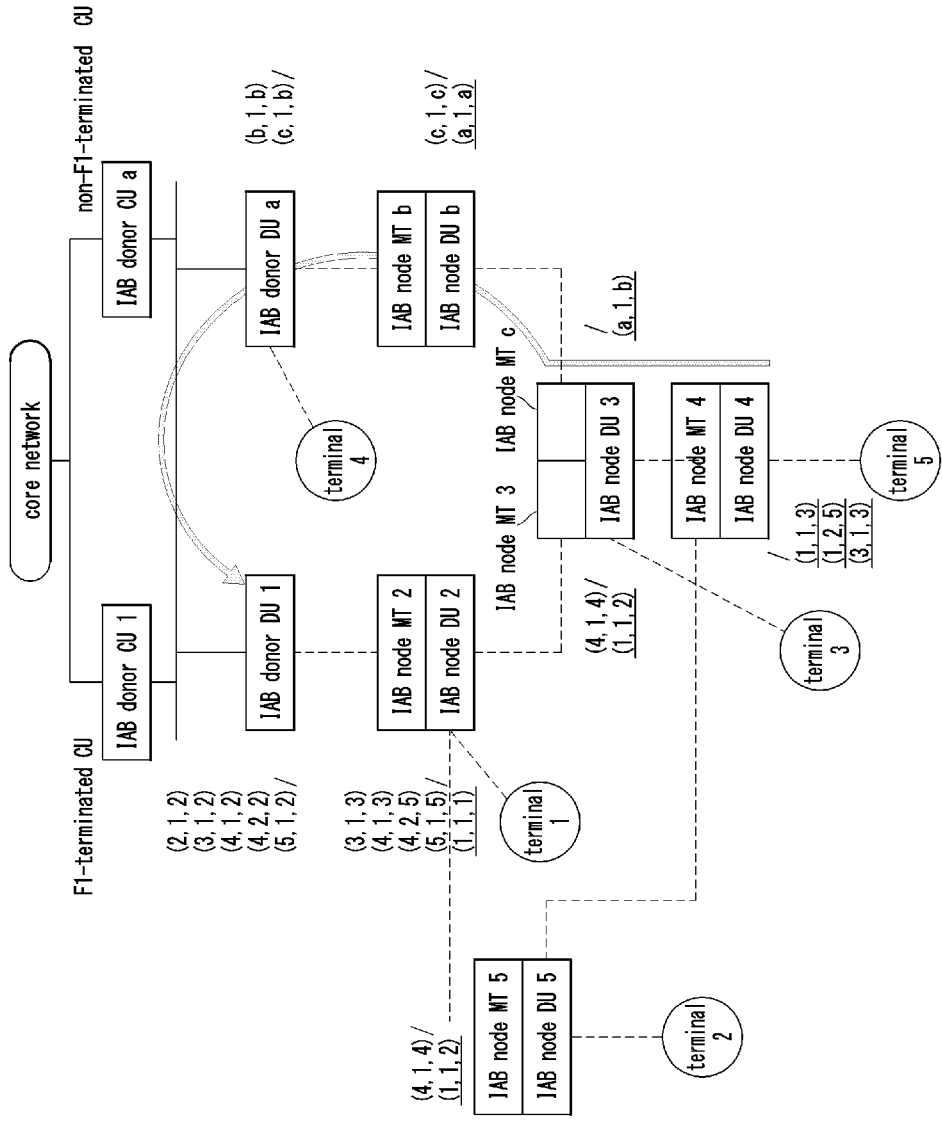
FIG. 14 is a conceptual diagram illustrating the first exemplary embodiment of the uplink traffic routing method in the IAB network.

FIG. 14 is a conceptual diagram illustrating the first exemplary embodiment of the uplink traffic routing method in the IAB network.

Referring to FIG. 14, in the traffic routing method, an IAB donor CU 1, which is an F1-terminated CU, may request a BAP address and a path identifier of an IAB node 3, which is a boundary IAB node, from an IAB donor CU a that is a non-F1-terminated CU. Then, the IAB donor CU a may receive the request for the BAP address and the path identifier of the IAB node 3 from the IAB donor CU 1. Accordingly, the IAB donor CU a may transmit a BAP address c and a path identifier 1 of the IAB node 3 to the IAB donor CU 1. The IAB donor CU 1 may receive the BAP address c and the path identifier 1 of the IAB node 3 from the IAB donor CU a.

In addition, the IAB donor CU 1 may request a BAP address and a path identifier of an IAB donor DU a from the IAB donor CU a. Then, the IAB donor CU a may receive the request for the BAP address and path identifier of the IAB donor DU a from the IAB donor CU 1. Accordingly, the IAB donor CU a may transmit the BAP address and the path identifier of the IAB donor DU a to the IAB donor CU 1. Then, the IAB donor CU 1 may receive the BAP address and the path identifier of the IAB donor DU a from the IAB donor CU a.

Thereafter, the IAB donor CU 1 may request the IAB node 3 to configure a reconfiguration mapping table for BAP header reconfiguration by transmitting the BAP address and the path identifier of the IAB donor DU a. The IAB node 3 may receive the request for configuring the reconfiguration mapping table for BAP header reconfiguration from the IAB donor CU 1. Accordingly, the IAB node 3 may configure the reconfiguration mapping table. In this case, the reconfiguration mapping table may include the BAP address, the path identifier, and an index indicating the corresponding information for the IAB donor DU a in the topology managed by the non-F1-terminated CU. Here, the index indicating the corresponding information may be the address 3 of the IAB node 3 in the F1-terminated topology.

The IAB donor CU 1 may request an IAB node 4, which is a child IAB node of the IAB node 3, to add an entry (3,1,3) destined for the IAB node 3 in its routing table. Then, the IAB node 4 may receive, from the IAB donor CU 1, the request for adding the entry (3,1,3) destined for the IAB node 3 in the routing table. Accordingly, the IAB node 4 may add the entry (3,1,3) destined for the IAB node 3 in the routing table. The IAB node 4 may transmit data including the BAP address 3 and the path identifier 1 of the IAB node 3 to the IAB node 3 when transmitting data using the non-F1-terminated topology.

Then, the IAB node 3 may receive the data destined for the IAB node 3 from the IAB node 4. The IAB node 3 may obtain the destination address 3 from the received data. Accordingly, the IAB node 3 may obtain the BAP address a of the index corresponding to the destination 3 of the corresponding data by referring to the reconfiguration mapping table. The IAB node 3 may rewrite the destination address of the received data from 3 to a. The IAB node 3 may transmit the rewritten data to an IAB Node b.

Accordingly, the IAB node b may receive the rewritten data from the IAB node 3. The IAB node b may identify the destination of the received data. The IAB node b may transmit data to the IAB donor node as the destination address is identified to indicate the IAB donor node. Accordingly, the IAB donor node may receive the data from the IAB node b.

FIG. 15 is a conceptual diagram illustrating a fifth exemplary embodiment of a BAP PDU.

A BAP PDU shown in FIG. 15 may be a BAP PDU for the uplink traffic routing shown in FIGS. 13 and 14. Such the BAP PDU may include a D/C field, a forwarding flag (F) field, a destination field, a path field, a routing index field, and a data field. Here, the forwarding flag F may be a flag for determining whether the BAP PDU received at the boundary IAB node is destined for the boundary IAB node or to be forwarded to another IAB node. The routing index may be an index indicating a BAP address and a path identifier of an actual destination. This index may be the BAP address of the boundary IAB node. Accordingly, the boundary IAB node may identify whether the F field is set by checking the header of the received BAP PDU. In this case, when it is identified that the F field is set, the boundary IAB node may rewrite the BAP address and path identifier to the BAP PDU header according to the indication of the routing index in the reconfiguration mapping table. The boundary IAB node may transmit the BAP PDU with reference to the routing table. If the F field of the BAP PDU header is not set, the boundary IAB node may determine that the BAP PDU has been transmitted to the boundary IAB node.

FIG. 16 is a conceptual diagram illustrating a sixth exemplary embodiment of a BAP PDU.

A BAP PDU shown in FIG. 16 may be a BAP PDU for the uplink traffic routing shown in FIGS. 13 and 14. Such the BAP PDU may include a D/C field, a destination field, a path field, an actual destination field, an actual path field, and a data field. Here, the actual destination field may be an address of an actual destination IAB node or an address of the IAB donor. The actual path field may be a field indicating an actual path identifier of the BAP PDU. The boundary IAB node may reconfigure and transmit the BAP PDU header using the actual destination address and the actual path identifier indicating the actual destination IAB node or the IAB donor included in the BAP PDU header. In this case, when the destination address and path of the BAP PDU are the same as the actual destination address and path, the boundary IAB node may determine that the BAP PDU has been transmitted to the boundary IAB node.

Figure 17:
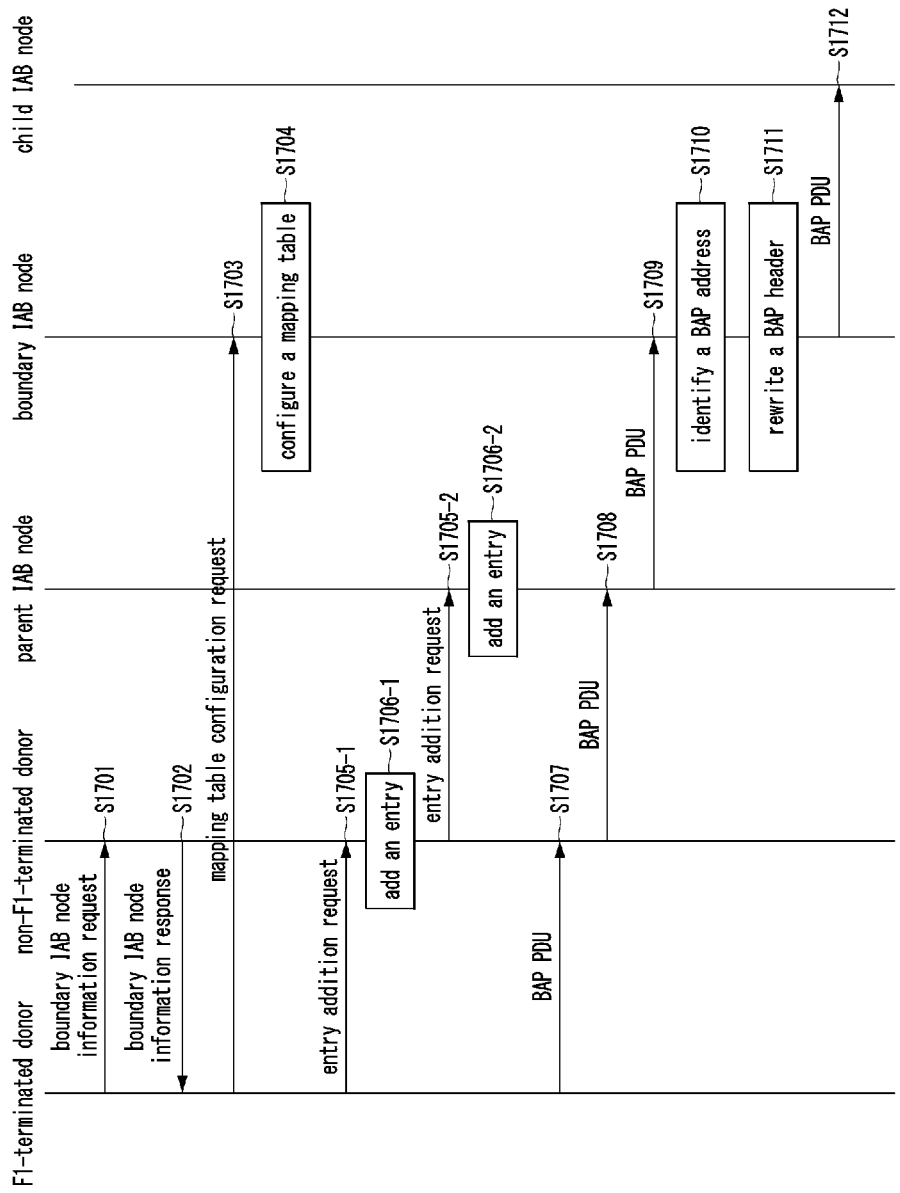
FIG. 17 is a sequence chart illustrating a first exemplary embodiment of a downlink traffic routing method in the IAB network.

FIG. 17 is a sequence chart illustrating a first exemplary embodiment of a downlink traffic routing method in the IAB network.

Referring to FIG. 17, in a downlink traffic routing method, an F1-terminated donor node may transmit, to a non-F1-terminated donor node, a boundary IAB node information request signal for requesting a BAP address and a path identifier of a boundary IAB node in a non-F1-terminated topology (S1701). Then, the non-F1-terminated donor node may receive, from the F1-terminated donor node, the boundary IAB node information request signal requesting a BAP address and a path identifier of a boundary IAB node in the non-F1-terminated topology. Accordingly, the non-F1-terminated donor node may transmit a BAP address and a path identifier of a boundary IAB node in the F1-terminated topology to the F1-terminated donor node (S1702). The F1-terminated donor node may receive the BAP address and the path identifier of the boundary IAB node in the F1-terminated topology from the non-F1-terminated donor node, and identify the BAP address and path identifier of the boundary IAB node.

In this case, the F1-terminated donor node may know a BAP address and a path identifier of the non-F1-terminated donor node. For example, the F1-terminated donor node may request the BAP address and path identifier of the non-F1-terminated donor node from the non-F1-terminated donor node, and may identify the BAP address and the path identifier of the non-F1-terminated donor node by receiving the BAP address and path identifier of the non-F1-terminated donor node transmitted from the non-F1-terminated donor node in response to the request.

Thereafter, the F1-terminated donor node may request the boundary IAB node to configure a reconfiguration mapping table for BAP header reconfiguration by transmitting the BAP address and path identifier of the boundary IAB node in the non-F1-terminated topology to the boundary IAB node (S1703). The boundary IAB node may receive the request for configuring the reconfiguration mapping table for BAP header reconfiguration from the F1-terminated donor node. Accordingly, the boundary IAB node may configure the reconfiguration mapping table (S1704). In this case, the reconfiguration mapping table may include a BAP address, a path identifier, and an index indicating the corresponding information for a child IAB node of the boundary IAB node. Here, the index indicating the corresponding information may be the BAP address of the boundary IAB node in the non-F1-terminated topology.

In addition, the non-F1-terminated donor node may request the non-F1-terminated donor node and the parent IAB node of the boundary IAB node to add an entry having the boundary IAB node as a destination address to their routing tables (S1705-1, S1705-2). Then, the non-F1-terminated donor node and the parent IAB node may receive from the non-F1-terminated donor node the request for adding the entry having the boundary IAB node as a destination address. Accordingly, the non-F1-terminated donor node and the parent IAB node may add the entry having the boundary IAB node as a destination address to their routing tables (S1706-1, S1706-2).

Meanwhile, the F1-terminated donor node may set a destination address of a header of a BAP PDU to the boundary IAB node when transmitting F1-C traffic/F1-U tunnel data using the non-F1-terminated topology, and transmit the BAP PDU to the non-F1-terminated node (S1707). Then, the non-F1-terminated donor node located in the non-F1-terminated topology may receive the BAP PDU transmitted from the F1-terminated donor node. The non-F1-terminated donor node may obtain the destination address of the header of the received BAP PDU and transmit it to the parent IAB node as the destination with reference to the added entry in the routing table (S1708). Accordingly, the parent IAB node located in the non-F1-terminated topology may receive the BAP PDU transmitted from the non-F1-terminated donor node. The parent IAB node may obtain the destination address of the header of the received BAP PDU and transmit it to the boundary IAB node as the destination with reference to the added entry in the routing table (S1709). Then, the boundary IAB node may receive the BAP PDU having the boundary IAB node as the destination address from the parent IAB node.

Accordingly, the boundary IAB node may obtain the destination address from the BAP PDU received from the parent IAB node. The boundary IAB node may obtain a BAP address indicated by an index corresponding to the destination address of the corresponding data in the reconfiguration mapping table (S1710).

In addition, the boundary IAB node may rewrite the destination address of the BAP PDU received from the parent IAB node with the BAP address obtained from the reconfiguration mapping table (S1711). Thereafter, the boundary IAB node may transmit the BAP PDU to a child IAB node by referring to the rewritten BAP address in the routing table (S1712). Accordingly, the child IAB node may receive the BAP PDU from the boundary IAB node.

Figure 18:
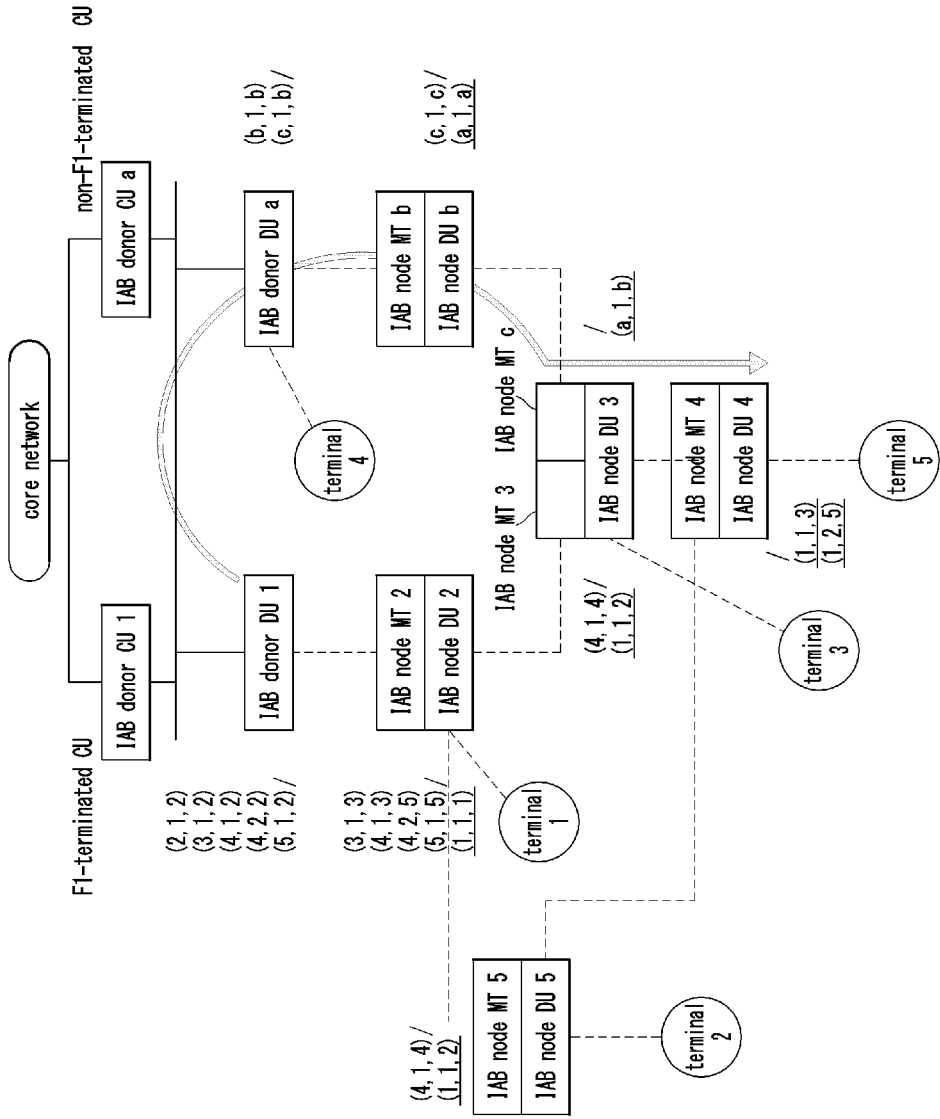
FIG. 18 is a conceptual diagram illustrating the first exemplary embodiment of the downlink traffic routing method in the IAB network.

FIG. 18 is a conceptual diagram illustrating the first exemplary embodiment of the downlink traffic routing method in the IAB network.

Referring to FIG. 18, in the traffic routing method, an IAB donor CU 1, which is an F1-terminated CU, may request a BAP address and a path identifier of an IAB node 3, which is a boundary IAB node, from an IAB donor CU a which is a non-F1-terminated CU. The IAB donor CU a may receive the request for the BAP address and the path identifier of the IAB node 3 from the IAB donor CU 1. Accordingly, the IAB donor CU a may transmit to the IAB donor CU 1 the BAP address c and the path identifier 1 of the IAB node 3 in the non-F1-terminated topology. The IAB donor CU 1 may receive the BAP address c and the path identifier 1 of the IAB node 3 from the IAB donor CU a.

Then, the IAB donor CU 1 may request the IAB node 3 to configure a reconfiguration mapping table by transmitting the BAP address c and the path identifier 1 of the IAB node 3 received from the IAB donor CU a. The IAB node 3 may receive the request for configuring a reconfiguration mapping table for BAP header reconfiguration from the IAB donor CU 1. Accordingly, the IAB node 3 may configure the reconfiguration mapping table. In this case, the reconfiguration mapping table may include a BAP address 4, a path identifier 1, and an index indicating the corresponding information of an IAB node 4 which is a child IAB node of the IAB node 3. Here, the index indicating the corresponding information may be the BAP address c of the IAB node 3 in the non-F1-terminated topology.

The IAB donor CU a may request the IAB donor DU a to add an entry (c,1,b) destined for the IAB node 3 in a routing table. The IAB donor DU a may receive, from the IAB donor CU a, the request for adding the entry (c,1,b) destined for the IAB node 3 in the routing table. Accordingly, the IAB donor DU a may add the entry (c, 1, b) destined for the IAB node 3 in the routing table.

In addition, the IAB donor CU a may request an IAB node b that is a parent IAB node of the boundary IAB node to add an entry (c,1,c) destined for the IAB node 3 in a routing table. Then, the IAB node b may receive, from the IAB donor CU a, the request for adding the entry (c,1,c) destined for the IAB node 3 in the routing table. Accordingly, the IAB node b may add the entry (c,1,c) destined for the IAB node 3 in the routing table.

Meanwhile, the IAB donor CU a may set a destination address of a header of a BAP PDU to the IAB node 3 (i.e., IAB node c) when transmitting F1-C traffic/F1-U tunnel data using the non-F1terminated topology, and transmit the BAP PDU to the IAB node b. Then, the IAB node b located in the non-F1-terminated topology may receive the data transmitted from the IAB donor CU a. In addition, the IAB node b may obtain the destination address of the header of the received data and transmit it to the IAB node 3 as the destination with reference to the added entry in the routing table. Then, the IAB node 3 may receive the data having the IAB node 3 as the destination address from the IAB node b.

Accordingly, the IAB node 3 may obtain the destination address c from the data received from the IAB node b. The IAB node 3 may obtain the BAP address 4 indicated by the index corresponding to the destination address c of the corresponding data in the reconfiguration mapping table. In addition, the IAB node 3 may rewrite the destination address of the data received from the IAB node b with the BAP address 4 obtained from the reconfiguration mapping table. Thereafter, the IAB node 3 may transmit the data to the IAB node 4 with reference to the rewritten BAP address in the routing table. Accordingly, the IAB node 4 may receive the data from the IAB node 3.

Meanwhile, the IAB network may perform data routing between the topology managed by the F1-terminated CU and the topology managed by the non-F1-terminated CU based on an IAB node virtual address assigned by the F1-terminated CU. This scheme may be a scheme of routing data after configuring a virtual mapping table for virtual addresses in the IAB node. The boundary IAB node may rewrite BAP header information of data delivered using a virtual address, and transmit it.

Figure 19:
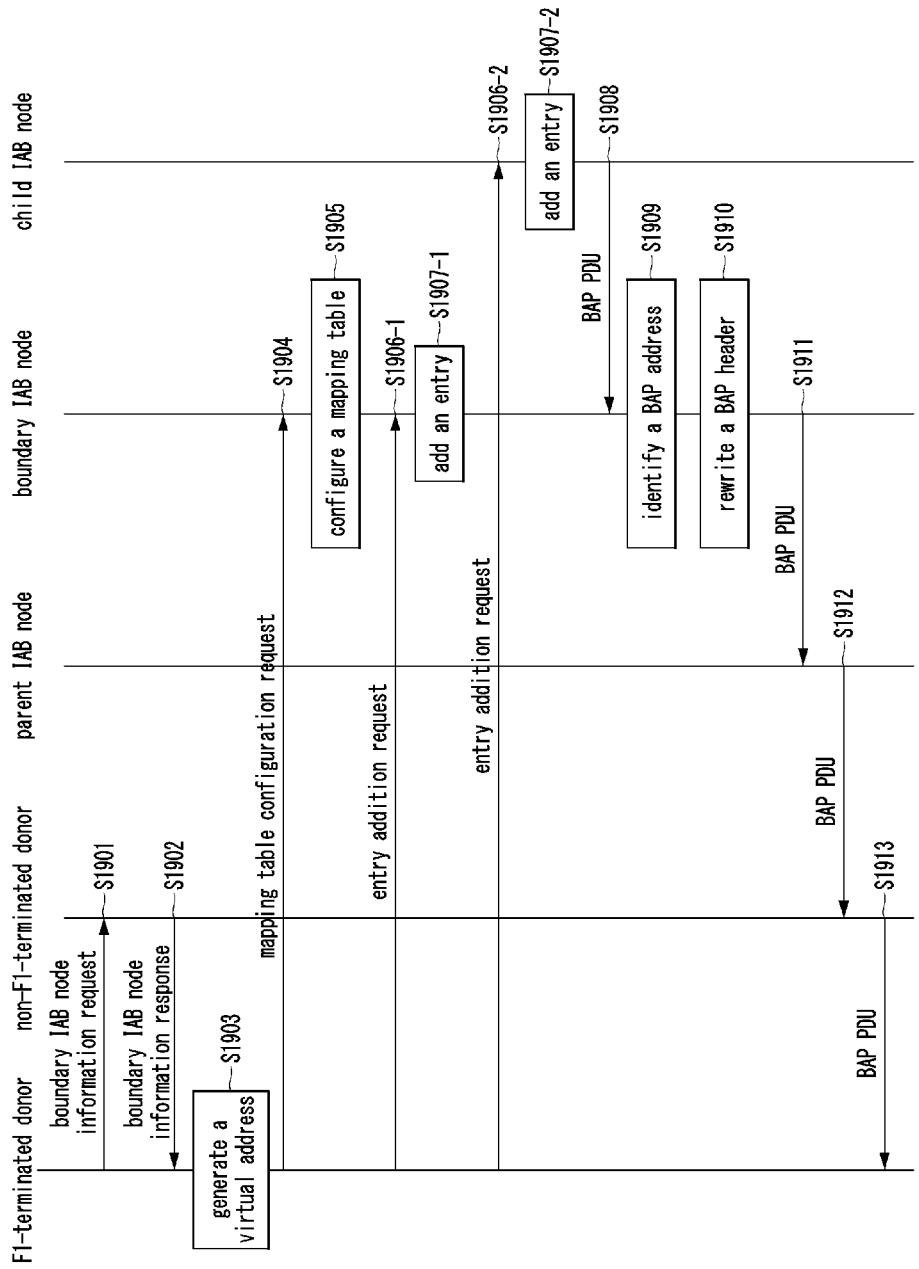
FIG. 19 is a sequence chart illustrating a second exemplary embodiment of an uplink traffic routing method in the IAB network.

FIG. 19 is a sequence chart illustrating a second exemplary embodiment of an uplink traffic routing method in the IAB network.

Referring to FIG. 19, in an uplink traffic routing method, an F1-terminated donor node may transmit a boundary IAB node information request signal for requesting a BAP address and a path identifier of an boundary IAB node to a non-F1-terminated donor node (S1901). The non-F1-terminated donor node may receive the boundary IAB node information request signal for requesting a BAP address and a path identifier of a boundary IAB node from the F1-terminated donor node. Accordingly, the non-F1-terminated donor node may transmit, to the F1-terminated donor node, a BAP address and a path identifier of a boundary IAB node in the F1-terminaed topology. The F1-terminated donor node may receive the BAP address and path identifier of the boundary IAB node in the F1-terminated topology from the non-F1-terminated donor node, and identify the BAP address and path identifier of the boundary IAB node.

In this case, the F1-terminated donor node may know a BAP address and a path identifier of the non-F1-terminated donor node. For example, the F1-terminated donor node may request the BAP address and path identifier of the non-F1-terminated donor node from the non-F1-terminated donor node, and may obtain the BAP address and path identifier of the non-F1-terminated donor node transmitted in response to the request.

Accordingly, the F1-terminated donor node may generate a virtual address of the non-F1-terminated donor node (S1903). The F1-terminated donor node may request the boundary IAB node to configure a virtual mapping table by transmitting the BAP address, path identifier, and virtual address of the non-F1-terminated donor node to the boundary IAB node (S1904). The boundary IAB node may receive the request for configuring a virtual mapping table for BAP header reconfiguration from the F1-terminated donor node. Accordingly, the boundary IAB node may configure a virtual mapping table (S1905). In this case, the virtual mapping table may include a virtual routing identifier and an actual routing identifier of the topology managed by the non-F1-terminated donor node. Here, the virtual routing identifier may include a virtual address and a path identifier, and the actual routing identifier may include an actual address corresponding to the virtual address and an actual path identifier.

In addition, the F1-terminated donor node may request the boundary IAB node and a child IAB node to add an entry destined for the virtual address of the non-F1-terminated donor node to their routing tables (S1906-1, S1906-2). Then, the boundary IAB node and the child IAB node may receive, from the F1-terminated donor node, the request for adding the entry destined for the virtual address of the non-F1-terminated donor node in the routing table. Accordingly, the boundary IAB node and the child IAB node may add the entry having the virtual address of the non-F1-terminated donor node as the final destination and having a next hop as the boundary IAB node in the routing table (S1907-1, S1907-2).

Meanwhile, the child IAB donor of the boundary IAB node may set a destination address of a header of a BAP PDU to the virtual address of the non-F1-terminated donor node when transmitting F1-C traffic/F1-U tunnel data using the non-F1-terminated topology, and transmit the BAP PDU to the boundary IAB node (S1908). The boundary IAB node may receive the BAP PDU having the virtual address of the non-F1-terminated donor node as the destination address from the child IAB node. Accordingly, the boundary IAB node may obtain the virtual address of the non-F1-terminated donor node, which is the destination address, from the BAP PDU received from the child IAB node. The boundary IAB node may obtain the actual address of the non-F1-terminated donor node corresponding to the virtual address of the non-F1-terminated donor node for the BAP PDU from the virtual mapping table (S1909).

The boundary IAB node may rewrite the destination address of the BAP PDU received from the child IAB node with the actual address of the non-F1-terminated donor node obtained from the virtual mapping table (S1910). Then, the boundary IAB node may transmit the BAP PDU using the rewritten actual address of the non-F1-terminated donor node to the parent IAB node by referring to the routing table (S1911). Accordingly, the parent IAB node may receive the BAP PDU from the boundary IAB node. Then, the parent IAB node may transmit the BAP PDU to the non-F1-terminated donor node, which is the upper node (S1912). Accordingly, the non-F1-terminated donor node CU may receive data from the parent IAB node. The non-F1-terminated donor node may transmit the BAP PDU to the F1-terminated donor node (S1913). The F1-terminated donor node may receive the BAP PDU from the non-F1-terminated donor node.

Figure 20:
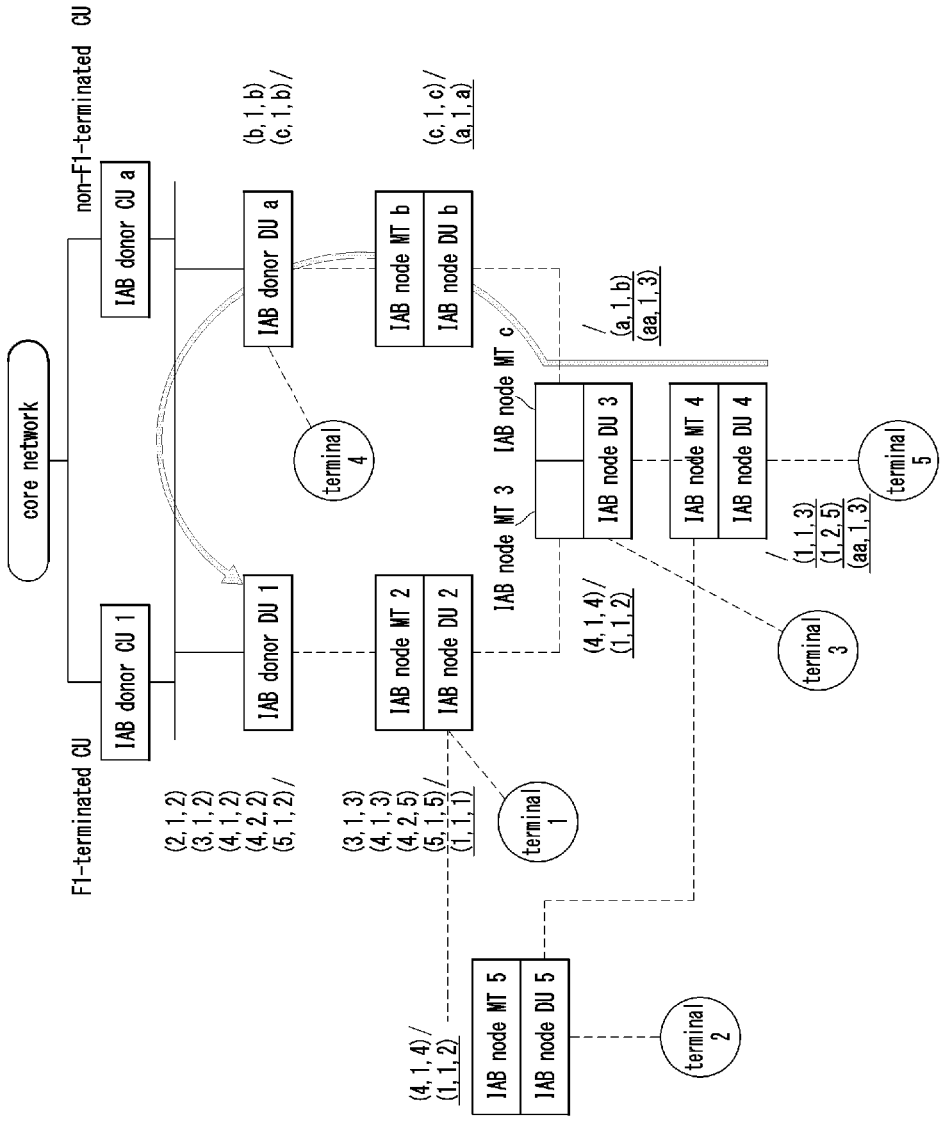
FIG. 20 is a conceptual diagram illustrating the second exemplary embodiment of the uplink traffic routing method in the IAB network.

FIG. 20 is a conceptual diagram illustrating the second exemplary embodiment of the uplink traffic routing method in the IAB network.

Referring to FIG. 20, in the uplink traffic routing method, an IAB donor CU 1, which is an F1-terminated CU, may transmit to an IAB donor CU a, which is an non-F1-terminated CU, a boundary IAB node information request signal for requesting a BAP address and a path identifier of an IAB node 3, which is a boundary IAB node. The non-F1-terminated donor CU a may receive the boundary IAB node information request signal for requesting the BAP address and the path identifier of the IAB node 3 from the IAB donor CU 1. Accordingly, the IAB donor CU a may transmit, to the IAB donor CU 1, the BAP address and the path identifier of the boundary IAB node in the F1-terminated topology. The IAB donor CU 1 may receive, from the IAB donor CU a, the BAP address and path identifier of the IAB node 3 in the F1-terminated topology, and identify the BAP address and the path identifier of the IAB node 3.

In this case, the IAB donor CU 1 may know a BAP address and a path identifier of the IAB donor CU a. For example, the IAB donor CU 1 may request the BAP address and the path identifier of the IAB donor CU a from the IAB donor CU a, and receive and identify the BAP address and the path identifier of the IAB donor CU a transmitted from the IAB donor CU a in response to the request. The IAB donor CU 1 may generate a virtual address aa, for example.

Then, the IAB donor CU 1 may request the IAB node 3, which is the boundary IAB node, to configure a virtual mapping table for BAP header reconfiguration by transmitting the BAP address a, the path identifier 1, and the virtual address aa of the non-F1-terminated DU to the IAB node 3. Accordingly, the IAB node 3 may receive the request for configuring a virtual mapping table for BAP header reconfiguration from the IAB donor CU 1. Accordingly, the IAB node 3 may configure a virtual mapping table. In this case, the virtual mapping table may include a virtual routing identifier and an actual routing identifier of the topology managed by the non-F1-terminated CU.

In addition, the IAB donor CU 1 may request the IAB node 3 and an IAB node 4 which is a child IAB node to add an entry (aa, 1, 3) destined for the virtual address of the IAB donor DU a that is the non-F1-terminated DU in their routing tables. Then, the IAB node 3 and the IAB node 4 may receive, from the IAB donor CU 1, the request for adding the entry (aa, 1, 3) destined for the virtual address of the IAB donor DU a in the routing table. Accordingly, the IAB node 3 and the IAB node 4 may add the entry having the virtual address of the IAB donor DU a as the final destination and having a next hop as the IAB node 3 in their routing tables.

Meanwhile, the IAB donor 4 may set a destination address of a header of a BAP PDU to the virtual address aa of the IAB donor DU a when transmitting F1-C traffic/F1-U tunnel data using the non-F1-terminated topology, and transmit the BAP PDU to the IAB node 3. Then, the IAB node 3 may receive data having the virtual address aa of the IAB donor DU a as the destination address from the IAB node 4. Accordingly, the IAB node 3 may obtain the actual address a corresponding to the virtual address aa of the corresponding data by referring to the virtual mapping table. Then, the IAB node 3 may rewrite the destination address aa of the BAP header with the BAP address a of the non-F1-terminated DU. Thereafter, the IAB node 3 may transmit the data to the IAB node b using the rewritten actual address of the non-F1-terminated DU by referring to the routing table. Accordingly, the IAB node b may receive the data from the IAB node 3. The IAB node 4 may transmit the data to the IAB donor DU 1 via the IAB donor DU a, which is an upper node. Accordingly, the IAB donor CU 1 may receive the data from the IAB node b.

Figure 21:
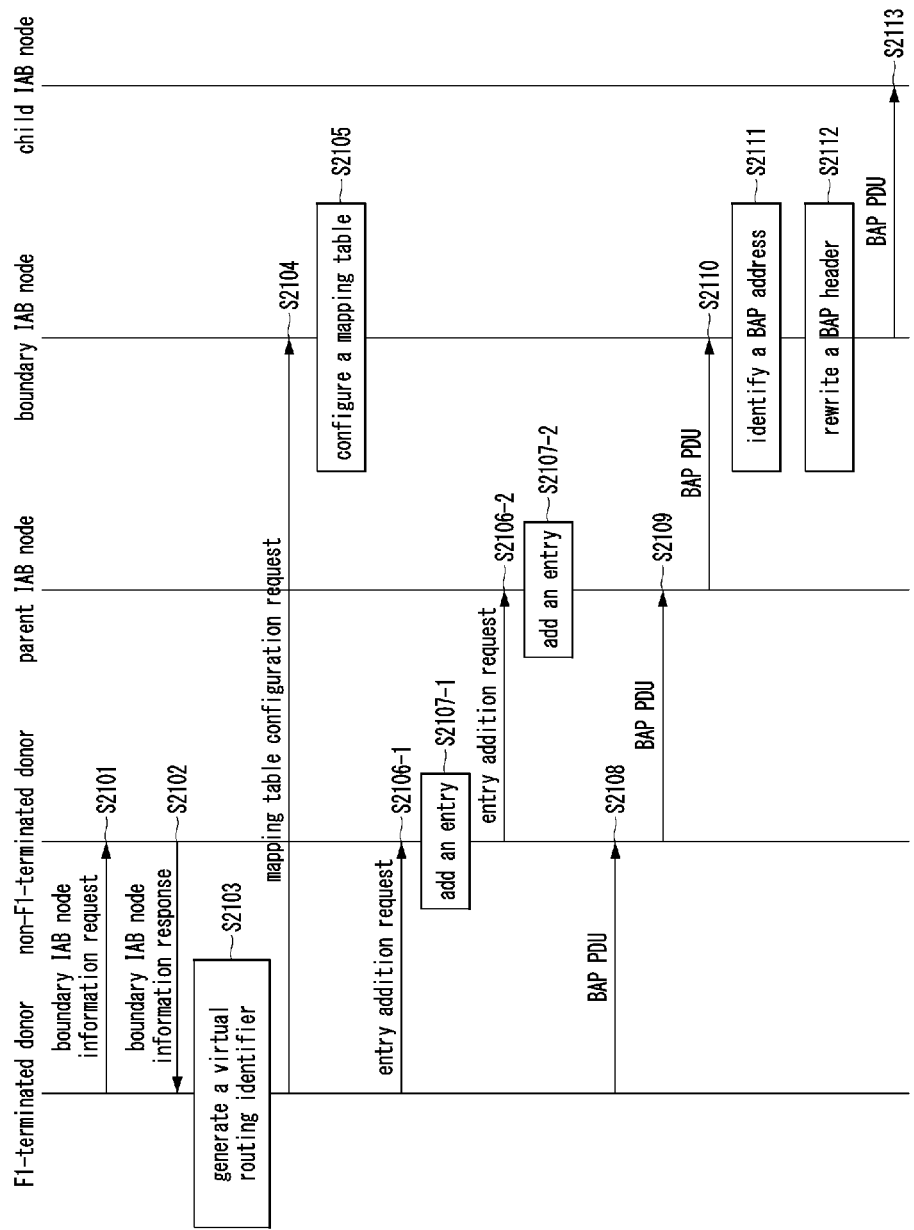
FIG. 21 is a sequence chart illustrating a second exemplary embodiment of a downlink traffic routing method in an IAB network.

FIG. 21 is a sequence chart illustrating a second exemplary embodiment of a downlink traffic routing method in an IAB network.

Referring to FIG. 21, in a downlink traffic routing method, an F1-terminated donor node may transmit a boundary IAB node information request signal for requesting a BAP address and a path identifier of a boundary IAB node to a non-F1-terminated donor node (S2101). The non-F1-terminated donor node may receive the boundary IAB node information request signal for requesting a BAP address and a path identifier of a boundary IAB node from the F1-terminated donor node. Accordingly, the non-F1-terminated donor node may transmit, to the F1-terminated donor node, a BAP address and a path identifier of a boundary IAB node in an F1-terminated topology (S2102). The F1-terminated donor node may receive, from the non-F1-terminated donor node, the BAP address and path identifier of the boundary IAB node in the F1-terminated topology, and identify the BAP address and the path identifier of the boundary IAB node.

In this case, the F1-terminated donor node may know a BAP address and a path identifier of the non-F1-terminated donor node. For example, the F1-terminated donor node may request the BAP address and the path identifier of the non-F1-terminated donor node from the non-F1-terminated donor node, and receive and identify the BAP address and the path identifier of the non-F1-terminated donor node transmitted in response to the request.

The F1-terminated donor node may generate a virtual address of a destination IAB node. The F1-terminated donor node may generate a virtual routing identifier including the virtual address and a path identifier of the destination IAB node (S2103). Then, the F1-terminated donor node may request the boundary IAB node to configure a virtual mapping table for BAP header reconfiguration (S2104). Then, the boundary IAB node may receive the request for configuring a virtual mapping table for BAP header reconfiguration from the F1-terminated donor node. Accordingly, the boundary IAB node may configure a virtual mapping table (S2105). In this case, the virtual mapping table may include, as entries, the virtual routing identifier including the virtual address and the path identifier of the destination IAB node, and an actual routing identifier including an actual address and an actual path identifier mapped thereto. Here, the F1-terminated donor node may be implemented to generate the virtual address of the destination IAB node. Alternatively, the non-F1-terminated donor node may generate the virtual address, and may provide the generated virtual address to the F1-terminated donor node.

Meanwhile, the F1-terminated donor node may request the non-F1-terminated donor node and a parent IAB node to add an entry having the virtual address of the destination IAB node as a destination address in their routing table (S2106-1, S2106-2). Then, the non-F1-terminated donor node and the parent IAB node may receive, from the F1-terminated donor node, the request for adding the entry having the virtual address of the IAB node as the destination address in the routing table. Accordingly, the non-F1-terminated donor node and the parent IAB node may add the entry having the virtual address of the destination IAB node as the final destination and having a next hop in their routing tables (S2107-1, S2107-2).

Meanwhile, the F1-terminated donor node may set a destination address of a header of a BAP PDU to the virtual address of the destination IAB node when transmitting F1-C traffic/F1-U tunnel data using the non-F1-terminated topology, and transmit the BAP PDU to the F1-terminated donor node. Then, the non-F1-terminated donor node may receive the BAP PDU from the F1-terminated node. Thereafter, the non-F1-terminated donor node may transmit the BAP PDU to the parent IAB node (S2109). Then, the parent IAB node located in the non-F1-terminated topology may receive the BAP PDU from the non-F1-terminated donor node. Then, the parent IAB node may obtain the destination address of the header of the received BAP PDU and transmit it to the boundary IAB node with reference to the added entry in the routing table (S2110). Then, the boundary IAB node may receive the BAP PDU including the virtual address of the destination IAB node from the parent IAB node. The boundary IAB node may obtain the virtual address of the destination IAB node from the received BAP PDU. Accordingly, the boundary IAB node may obtain the actual address of the destination IAB node corresponding to the virtual address by referring to the virtual mapping table (S2111).

Then, the boundary IAB node may rewrite the destination address of the BAP PDU received from the parent IAB node with the actual address of the destination IAB node obtained from the virtual mapping table (S2112). Thereafter, the boundary IAB node may transmit the data to a child IAB node using the rewritten actual address by referring to the routing table (S2113). Accordingly, the child IAB node may receive the BAP PDU from the boundary IAB node.

Figure 22:
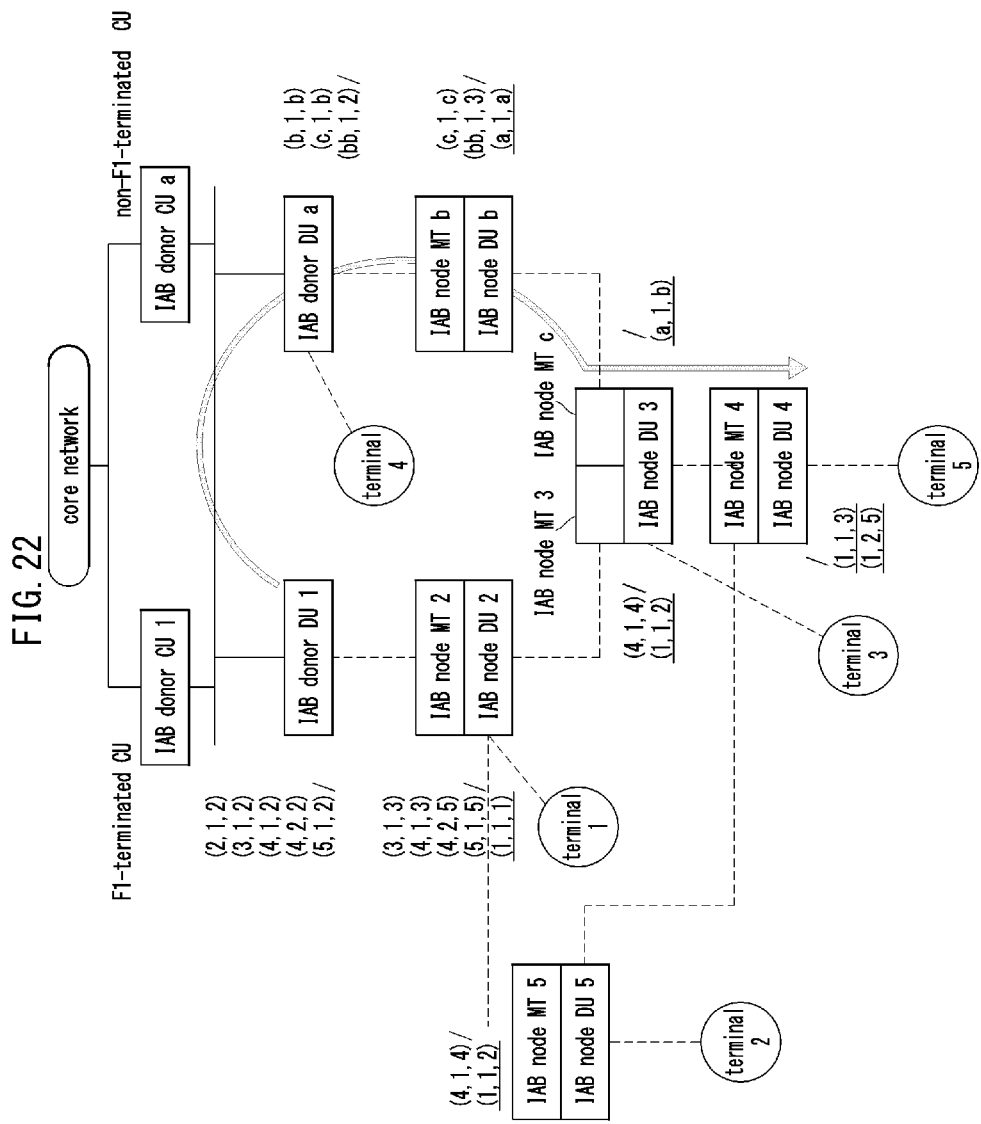
FIG. 22 is a conceptual diagram illustrating the second exemplary embodiment of the downlink traffic routing method in the IAB network.

FIG. 22 is a conceptual diagram illustrating the second exemplary embodiment of the downlink traffic routing method in the IAB network.

Referring to FIG. 22, in the downlink traffic routing method, an IAB donor CU 1, which is an F1-terminated CU, may transmit to an IAB donor CU a, which is a non-F1-terminated CU, a boundary IAB node information request signal for requesting a BAP address and a path identifier of an IAB node 3, which is a boundary IAB node. The non-F1-terminated donor CU a may receive the boundary IAB node information request signal for requesting the BAP address and the path identifier of the IAB node 3 from the IAB donor CU 1. Accordingly, the IAB donor CU a may transmit the BAP address and the path identifier of the boundary IAB node in the F1-terminated topology to the IAB donor CU 1. The IAB donor CU 1 may receive from the IAB donor CU a the BAP address and the path identifier of the IAB node 3 in the F1-terminated topology, and identify the BAP address and the path identifier of the IAB node 3.

In this case, the IAB donor CU 1 may know a BAP address and a path identifier of the IAB donor CU a. For example, the IAB donor CU 1 may request the BAP address and the path identifier of the IAB donor CU a from the IAB donor CU a, and receive and identify the BAP address and the path identifier of the IAB donor CU a transmitted in response to the request.

The IAB donor CU 1, which is an F1-terminated CU, may generate a virtual address of an IAB node 4 that is a destination IAB node, and may generate a virtual routing identifier including the virtual address and a path identifier. Thereafter, the IAB donor CU 1 may request the IAB node 3 which is the boundary IAB node to configure a virtual mapping table for BAP header reconfiguration by transmitting the virtual address and the path identifier to the IAB node 3. Then, the IAB node 3 may receive the request for configuring a virtual mapping table for BAP header reconfiguration from the IAB donor CU 1. Accordingly, the IAB node 3 may configure a virtual mapping table. In this case, the virtual mapping table may include, as entries, a virtual address bb and a path identifier 1 of the IAB node 4 that is the destination IAB node, and an actual address 4 and a path identifier 1 mapped thereto.

Meanwhile, the IAB donor CU 1 may request the IAB donor DU a and an IAB node b to add an entry having the virtual address of the IAB node 4 as a destination address to their routing tables. The IAB donor DU a and the IAB node b may receive the request for adding an entry destined for the virtual address of the IAB node 4. Accordingly, the IAB donor DU a may add an entry (bb, 1, 2) having the virtual address of the IAB node 4, the path identifier, and a next hop address in its routing table. In addition, the IAB node b may add an entry (bb, 1, 3) having the virtual address of the IAB node 4, the path identifier, and a next hop address in its routing table.

Meanwhile, the IAB donor DU 1 may set a destination address of a header of a BAP PDU to the virtual address of the IAB node 4 when transmitting F1-C traffic/F1-U tunnel data using the non-F1-termination topology, and transmit the BAP PDU to the IAB donor DU a. Then, the IAB donor DU a may receive the BAP PDU from the IAB donor CU 1 and deliver it to the IAB node b. Then, the IAB node b located in the non-F1-terminated topology may receive the BAP PDU transmitted from the IAB donor DU a. In addition, the IAB node b may obtain the destination address of the header of the received BAP PDU and transmit it to the IAB node 3, which is the boundary IAB node, as the destination with reference to the added entry in the routing table.

Then, the IAB node 3 may receive the BAP PDU having the virtual address of the IAB node 4 as the destination address from the IAB node b. Accordingly, the IAB node 3 may rewrite the destination address of the BAP header set to the virtual address aa with the actual address of the IAB node 4 with refence to the virtual mapping table, and transmit it to the IAB node 4. Then, the IAB node 4 may receive the BAP PDU from the IAB node 3.

Figure 23:
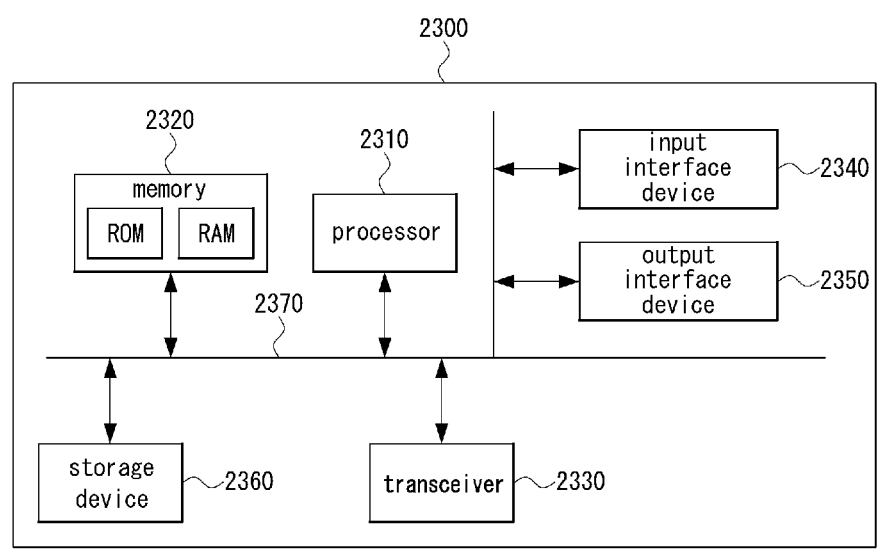
FIG. 23 is a block diagram illustrating an exemplary embodiment of a communication node in the IAB network.

FIG. 23 is a block diagram illustrating an exemplary embodiment of a communication node in the IAB network.

Referring to FIG. 23, a communication node 2300 in the IAB network may comprise at least one processor 2310, a memory 2320, and a transceiver 2330 connected to the network for performing communications. Also, the communication node 2300 may further comprise an input interface device 2340, an output interface device 2350, a storage device 2360, and the like. The respective components included in the communication node 2300 may communicate with each other as connected through a bus 2370. However, each component included in the communication node 2300 may be connected to the processor 2310 via an individual interface or a separate bus, rather than the common bus 2370. For example, the processor 2310 may be connected to at least one of the memory 2320, the transceiver 2330, the input interface device 2340, the output interface device 2350, and the storage device 2360 via a dedicated interface.

The processor 2310 may execute instructions stored in at least one of the memory 2320 and the storage device 2360. The processor 2310 may refer to a central processing unit (CPU), a graphics processing unit (GPU), or a dedicated processor on which methods in accordance with embodiments of the present disclosure are performed. Each of the memory 2320 and the storage device 2360 may be constituted by at least one of a volatile storage medium and a non-volatile storage medium. For example, the memory 2320 may comprise at least one of read-only memory (ROM) and random access memory (RAM). Here, the communication node 2300 may be an IAB node or a terminal.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a boundary integrated access and backhaul (IAB) node between a first topology and a second topology in a communication system, the operation method comprising:
receiving, from a first IAB donor node included in the first topology, a first address of a first node included in the second topology;
receiving, from a node connected to the boundary IAB node, data including a relay request using a second address as a destination address;
rewriting the destination address of the data with the first address indicated by the second address in a mapping table; and
routing the data towards the first node.

2. The operation method according to claim 1, wherein the first node is a second IAB donor node of the second topology, the first address is a first backhaul adaptation protocol (BAP) address of the second IAB donor node, the second address is a second BAP address of the boundary IAB node in the first topology, the mapping table includes the first BAP address and an index indicating the first BAP address, and the index is the second BAP address.

3. The operation method according to claim 2, wherein the rewriting of the destination address of the data comprises:
obtaining the second BAP address, which is the second address, from the data;
identifying the first BAP address indicated by the obtained second BAP address from the mapping table; and
rewriting the destination address of the data with the first BAP address.

4. The operation method according to claim 1, wherein the first node is a child node of the boundary IAB node, the first address is a third BAP address of the child node, the second address is a fourth BAP address of the boundary IAB node in the second topology, the mapping table includes the third BAP address and an index indicating the third BAP address, and the index is the fourth BAP address.

5. The operation method according to claim 4, wherein the rewriting of the destination address of the data comprises:
obtaining the fourth BAP address, which is the second address, from the data;
identifying the third BAP address indicated by the obtained fourth BAP address from the mapping table; and
rewriting the destination address of the data with the third BAP address.

6. The operation method according to claim 1, wherein the first node is a second IAB donor node of the second topology, the first address is a first BAP address of the second IAB donor node, the second address is a first virtual address of the boundary IAB node, the mapping table includes the first BAP address and an index indicating the first BAP address, and the index is the first virtual address.

7. The operation method according to claim 6, wherein the rewriting of the destination address of the data comprises:
obtaining the first virtual address, which is the second address, from the data;

identifying the first BAP address indicated by the obtained first virtual address from the mapping table; and rewriting the destination address of the data with the first BAP address.

8. The operation method according to claim 1, wherein the first node is a child node of the boundary IAB node, the first address is a third BAP address of the child node, the second address is a second virtual address of the boundary IAB node, the mapping table includes the third BAP address and an index indicating the third BAP address, and the index is the second virtual address.

9. The operation method according to claim 8, wherein the rewriting of the destination address of the data comprises:

obtaining the second virtual address, which is the second address, from the data;

identifying the third BAP address indicated by the obtained second virtual address from the mapping table; and rewriting the destination address of the data with the third BAP address.

10. A boundary integrated access and backhaul (IAB) node comprising:

a processor;

a memory electronically communicating with the processor; and instructions stored in the memory, wherein when executed by the processor, the instructions cause the boundary IAB node to:

receive, from a first IAB donor node included in a first topology, a first address of a first node included in a second topology;

receive, from a node connected to the boundary IAB node, data including a relay request using a second address as a destination address;

rewrite the destination address of the data with the first address indicated by the second address in a mapping table; and route the data towards the first node.

11. The boundary IAB node according to claim 10, wherein in the rewriting of the destination address of the data, the instructions further cause the boundary IAB node to:

obtain a second BAP address of the boundary IAB node in the first topology, which is the second address, from the data;

identify a first BAP address of a second IAB donor node in the second topology, which is the first address indicated by the obtained second BAP address, from the mapping table; and rewrite the destination address of the data with the first BAP address.

12. The boundary IAB node according to claim 10, wherein in the rewriting of the destination address of the data, the instructions further cause the boundary IAB node to:

obtain a fourth BAP address of the boundary IAB node in the second topology, which is the second address, from the data;

identify a third BAP address of a child node of the boundary IAB node, which is indicated by the obtained fourth BAP address, from the mapping table; and rewrite the destination address of the data with the third BAP address.

* * * * *